(12) United States Patent
Green et al.

(10) Patent No.: US 7,212,207 B2
(45) Date of Patent: May 1, 2007

(54) METHOD AND APPARATUS FOR REAL-TIME GLOBAL ILLUMINATION INCORPORATING STREAM PROCESSOR BASED HYBRID RAY TRACING

(75) Inventors: Robin J. Green, Redwood City, CA (US); Gabor Nagy, San Mateo, CA (US)

(73) Assignee: Sony Computer Entertainment Inc., Tokyo (JP)

(*) Notice: Subject to any disclaimer, the term of this patent is extended or adjusted under 35 U.S.C. 154(b) by 199 days.

(21) Appl. No.: 10/645,819

(22) Filed: Aug. 20, 2003

(65) Prior Publication Data

US 2005/0041024 A1 Feb. 24, 2005

(51) Int. Cl.
*G06T 15/60* (2006.01)
*G09G 5/00* (2006.01)

(52) U.S. Cl. ........................... 345/426; 345/582
(58) Field of Classification Search ................. 345/426
See application file for complete search history.

(56) References Cited

U.S. PATENT DOCUMENTS

| | | | |
|---|---|---|---|
| 6,268,860 B1 * | 7/2001 | Bonello | 345/426 |
| 6,639,595 B1 * | 10/2003 | Drebin et al. | 345/426 |
| 2001/0028352 A1 * | 10/2001 | Naegle et al. | 345/501 |

FOREIGN PATENT DOCUMENTS

EP 1 189 173 A2 3/2002
WO WO 98/45815 10/1998

OTHER PUBLICATIONS

Peter-Pike Sloan, Jan Kautz, John Snyder, "Precomputed radiance transfer for real-time rendering in dynamic, low-frequency lighting environments," Jul. 2002, ACM Transactions on Graphics (TOG), v. 21, n. 3.*
Timothy J. Purcell, Ian Buck, William R. Mark, Pat Hanrahan, "Ray tracing on programmable graphics hardware," Jul. 2002, In Proceedings of the 29th Annual Conference on Computer Graphics and Interactive Technique.*
Robert L. Cook, "Stochastic sampling in computer graphics," Jan. 1986, ACM Transactions on Graphics (TOG), v.5 n.1, p. 51-72.*
Stephen H. Westin, James R. Arvo, Kenneth E. Torrance, "Predicting reflectance functions from complex surfaces," Jul. 1992, Proceedings of the 19th annual conference on Computer graphics and interactive techniques, p. 255-264.*

(Continued)

*Primary Examiner*—Ulka Chauhan
*Assistant Examiner*—Jason M. Repko
(74) *Attorney, Agent, or Firm*—Martine Penilla & Gencarella, LLP

(57) ABSTRACT

A method for calculating a lighting function for an object to be rendered using a basis function is provided. The method includes calculating a transfer function approximation of the lighting function through a stream processor. A method for presenting lighting characteristics associated with a display object in real-time and a method for determining secondary illumination features for an object to be displayed are also provided. A computer readable medium and a computing device having a graphics processing unit capable of determining lighting characteristics for an object in real time are also included.

18 Claims, 23 Drawing Sheets

OTHER PUBLICATIONS

Tomas Möller, Eric Haines, "Real-Time Rendering," 1999, A.K. Peters, p. 68-71.*

Nathan A. Carr, Jesse D. Hall and John C. Hart, "The Ray Engine," Mar. 2002, Tech. Rep. UIUCDCS-R-2002-2269, Department of Computer Science, University of Illinois.*

John D. Owens, William J. Dally, Ujval J. Kapasi, Scott Rixner, Peter Mattson, Ben Mowery, "Polygon rendering on a stream architecture," Aug. 2000, Proceedings of the ACM SIGGRAPH/EUROGRAPHICS workshop on Graphics hardware, p. 23-32.*

Jan Kautz, Peter-Pike Sloan and John Snyder, "Fast, Arbitrary BRDF Shading for Low-Frequency Lighting Using Spherical Harmonics," Jun. 26, 2002, Proceedings of the 13th Eurographics Workshop on Rendering, p. 291-296, 335.*

Peter-Pike Sloan, Jan Kautz, John Snyder, "Precomputed Radiance Transfer for Real-Time Rendering in Dynamic, Low-Frequency Lighting Environments," Jul. 2002, ACM Transactions on Graphics, vol. 21, No. 3, p. 527-536.*

Timothy J. Purcell, Ian Buck, William R. Mark, Pat Hanrahan, "Ray Tracing on Programmable Graphics Hardware," Jul. 2002, ACM Transactions on Graphics, vol. 21, No. 3, p. 703-712.*

Robert L. Cook, "Stochastic Sampling in Computer Graphics," Jan. 1986, ACM Transactions on Graphics, vol. 5, No. 1, p. 51-72.*

Tomas Möller, Eric Haines, "Real-Time Rendering," 1999, A.K. Peters, p. 68.*

Nathan A. Carr, Jesse D. Hall and John C. Hart, "The Ray Engine," Mar. 2002, Tech. Rep. UIUCDCS-R-2002-2269, Department of Computer Science, University of Illinois.*

John D. Owens, Williams J. Dally, Ujval J. Kapasi, Scott Rixner, Peter Mattson, Ben Mowery, "Polygon Rendering on a Stream Architecture," Aug. 2000, Proceedings of the ACM SIGGRAPH/EUROGRAPHICS Workshop on Graphics Hardware, p. 23-32.*

Stephen H. Westin, James R. Arvo, Kenneth E. Torrance, "Predicting Reflectance Functions from Complex Surfaces," Jul. 1992, Proceedings of the 19th Annual Conference on Computer Graphics and Interactive Techniques, p. 255-264☐☐.*

Jan Kautz, Peter-Pike Sloan and John Snyder, "Fast, Arbitrary BRDF Shading for Low-Frequency Lighting Using Spherical Harmonics," Jun. 26, 2002, Proceedings of the 13th Eurographics Workshop on Rendering, p. 291-296, 335.*

Peter-Pike Sloan, Jan Kautz, John Snyder, "Precomputed Radiance Transfer for Real-Time Rendering in Dynamic, Low-Frequency Lighting Environments," Jul. 2002, ACM Transactions on Graphics, vol. 21 No. 3, p. 527-536.*

Timothy J. Purcell, Ian Buck, William R. Mark, Pat Hanrahan, "Ray Tracing on Programmable Graphics Hardware," Jul. 2002, ACM Transactions on Graphics, vol. 21, No. 3, p. 703-712.*

John D. Owens, William J. Dally, Ujval J. Kapasi, Scott Rixner, Peter Mattson, Ben Mowery, "Polygon Rendering on a Stream Architecture," Aug. 2000, Proceedings of the ACM SIGGRAPH/EUROGRAPHICS Workshop on Graphics Hardware, p. 23-32.*

Hadwiger et al, "*Hardware-Accelerated High-Quality Filtering on PC Hardwar*", International Workshop on Vision, Modeling and Visualization. Proceedings, XX, XX, Nov. 21, 2001, p. 105-112, 520, XP009027713.

McCool et al., "*Texture Shaders*", Proceedings 1999 Eurographics / SIGGRAPH Workshop on Graphics Hardware. Los Angeles, California, Aug. 8-9, 1999, SIGGRAPH / Eurographics Workshop on Graphics hardware, New York, NY: ACM, US, Aug. 8, 1999, pp. 117-126, 144, XP000977118.

Watt, A., "3D Computer Graphics", 2000, Addison-Wesley, Harlow, England, GB, pp. 205-262, 275-305, XP002342548, Chapters 7.3, 7.7, 8: Introduction, 8.5, 10.1.1, 10.1.2.

Watt et al., "3D Games", 2001, Addison-Wesley, Harlow, England, GB, pp. 215-244, 314-328, XP002342549, Chapters 7.1, 10.1, 10.6.1.

Green, "*Spherical Harmonic Lighting: The Gritty Detail*", XP-002308100, Retrieved from the Internet: URL:http://www.research.scea.com/research/research.html, Jan. 16, 2003.

Kautz et al., "*Fast, Arbitrary BRDF Shading for Low-Frequency Lighting Using Spherical Harmonics*", Proceedings of the 13th Eurographics Workshop on Rendering, PISA, Italy 2002. Eurographics Workshop Proceedings ACM New York, NY, USA, 2002, pp. 291-335, XP002308101.

Heidrich et al., "*Realistic, Hardware-accelerated Shading and Lighting*", Computer Graphics. SIGGRAPH 99 Conference Proceedings. Los Angeles, California, Aug. 8-13, 1999, Computer Graphics Proceedings. SIGGRAPH, New York, NY: ACM, US, Aug. 8, 1999, pp. 171-178, XP001032897.

\* cited by examiner

METHOD AND APPARATUS FOR REAL-TIME GLOBAL ILLUMINATION INCORPORATING STREAM PROCESSOR BASED HYBRID RAY TRACING

CROSS REFERENCE TO RELATED APPLICATION

This application is related to U.S. patent application Ser. No. 10/645,694, filed on the same day as the instant application and entitled "METHOD AND APPARATUS FOR SELF SHADOWING AND SELF INTERREFLECTION LIGHT CAPTURE," which is incorporated herein by reference for all purposes.

BACKGROUND OF THE INVENTION

1. Field of the Invention

This invention relates generally to video processing and more particularly to providing a real-time shading model for rendering objects on a display.

2. Description of the Related Art

Game developers are constantly refining image synthesis to create a technique that presents a realistic visual impression for users. One aspect of image synthesis that is used to present a realistic visual impression is the accurate portrayal of shadows and shading. Normal lighting for computer games rely on vector dot product calculations, which are relatively simple, but inaccurate. While the vector dot product calculations are able to present hard edge shadows, theses type of calculations cannot present soft edge shadows.

FIG. 1A is a schematic diagram representing an exemplary lighting computation scheme for rendering a display. Light source 100 includes a number of points that emit light. Occlusion surface 102 blocks a portion of the light from light source 100 that is directed to surface 104. Thus, a hard edge shadow (the umbra) is defined by region 106 from occlusion surface 102. However, point 110, which lies in soft shadow region (or penumbra) 108, requires that multiple points on light source 100 be picked out and the shadow projection for each of the points is determined. Each of the shadow projections is then summed, therefore, with respect to point 110 the summation of a number of lighting functions is required to realistically display points in soft shadow region 108. However, the calculation and summation of the lighting functions are computationally intensive and not viable alternatives for presenting realistic shading in real time. Furthermore, adding another light source, which is common especially in video games, requires another complete calculation.

One attempt to address this shortcoming is the use of a special case list which may be used to define the shading properties when certain criteria are met. However, the special case list is not exhaustive and as a result the list must be updated for each new situation. Moreover, the attempt to force a particular situation to fit a special case may result in sub-optimal display quality. Additionally, the special case list acts as a restriction on the game developer.

A ray tracer is a piece of software that is used to represent 3 dimensional data as an image. Unlike traditional polygonal 3-D engines, ray tracers excel at rendering curved surfaces, shadows and reflections. It is for these reasons that ray tracing has long been the method of choice for professionally rendered 3-D graphics and movie special effects. This greater functionality comes at the price of speed, which is why, ray tracers could not be used in real-time to define shading characteristics for a lighting function.

FIG. 1B is a simplified schematic diagram illustrating a ray tracing technique applied to visibility testing. Ray tracing works by projecting a ray of vision through each pixel on screen 101 from observer 103. It should be appreciated that where rays defined between ray 103-1 and ray 103-2 intersect object 105a, projected object 105b appears on screen 101. Generally, ray tracing uses objects that can be defined mathematically by 1st of $2^{nd}$ degree equations. For every pixel on screen 101, an equation involving the ray through that pixel from observer 103 and each object in the scene is solved to determine if the corresponding ray intersects the object. Then, the pixel through which the ray passes is set to the color of the intersected object at the point of intersection. If more than one object is intersected, then the closer of the intersections is taken.

Reflections and shadows are achieved through what is known as recursive ray tracing. When figuring out the color of the intersection, one important factor is whether that point is in shadow, e.g., 107a and 107b, or not. To find this out, the same techniques are used, but instead of the normal location of the observer, the ray starts at the point of intersection and moves toward any light sources, such as light source 109. If the ray intersects something, then the point is in shadow. When a reflective surface is intersected, a new ray is traced starting from the point of intersection. The color that this ray returns is incorporated into the color of the original intersection. The process is called recursive because reflected rays, such as reflected ray 111 may spawn more reflected rays as long as the rays keep intersecting reflective objects.

To generate an image, mathematical rays are "fired" from a common origin (the camera or observer) through each pixel on the screen. Each ray is tested against each object in the scene to determine if the ray intersects the object. The distance from the observer to the intersections is calculated and the color of the closest intersected object is used for the pixel through which the ray is fired. However, due to the high computational cost associated with ray tracing, especially when interreflecting light between surfaces, ray tracing has not been a viable alternative for providing global illumination, e.g., soft shadows and self interreflection, in real time.

As a result, there is a need to solve the problems of the prior art to provide a method and apparatus for enabling ray tracing to be utilized for high quality lighting calculations where the result is rendered as polygons in real time.

SUMMARY OF THE INVENTION

Broadly speaking, the present invention fills these needs by providing a method and apparatus that takes advantage of features associated with omni-directional basis functions and stream processing functionality in order to apply ray tracing techniques for lighting calculations. It should be appreciated that the present invention can be implemented in numerous ways, including as a method, a system, computer readable medium or a device. Several inventive embodiments of the present invention are described below.

In one embodiment, a method for presenting lighting characteristics associated with a display object in real-time is provided. The method initiates with executing a ray tracing algorithm through a stream processor. The executing includes generating a ray associated with a point on the display object. Next, an approximation of a transfer function component is determined using at least one basis function.

In another embodiment, a method for determining secondary illumination features for an object to be displayed is provided. The method initiates with providing a stream processor capable of identifying a path associated with a ray. Then, a ray is generated from a point on the object. Next, it is determined if the path of the ray intersects a surface. Then, an approximation to a transfer function associated with at least one basis function is calculated, wherein the approximation to the transfer function represents a component of the secondary illumination features.

In yet another embodiment, a computer readable medium having program instructions for presenting lighting characteristics associated with a display object in real-time is provided. The computer readable medium includes program instructions for executing a ray tracing algorithm through a stream processor. The program instructions for executing a ray tracing algorithm include program instructions for generating a ray associated with a point on the display object. Program instructions for determining an approximation of a transfer function component using at least one basis function are also provided.

In still yet another embodiment, a computer readable medium having program instructions for determining secondary illumination features for an object to be displayed is provided. The computer readable medium includes program instructions for accessing a stream processor capable of identifying a path associated with a ray. Program instructions for generating a ray from a point on the object are provided. Program instructions for determining if the path of the ray intersects a surface are included. Program instructions for calculating an approximation to a transfer function associated with at least one basis function are also included, wherein the approximation to the transfer function represents a component of the secondary illumination features.

In another embodiment, a method for calculating an approximation to a transfer function defined by at least one basis function for rendering shading characteristics of an object in real time is provided. The method initiates with identifying a point on the object. Then, a lighting function for the point is calculated. Calculating the lighting function for the point includes: applying a ray tracing algorithm through a stream processor; determining a direct illumination transfer function for the point in real time; and determining a secondary lighting contribution in real time through a series of multiply and add operations applied to data resulting from the ray tracing algorithm.

In yet another embodiment, a method for calculating a lighting function for an object to be rendered using a basis function. The method includes calculating a transfer function approximation of the lighting function through a stream processor.

In still yet another embodiment, a computer readable medium having program instructions for calculating an approximation to a transfer function defined by at least one basis function for rendering shading characteristics of an object in real time is provided. The computer readable medium includes program instruction for identifying a point on the object and program instruction for calculating a lighting function for the point. The program instruction for calculating include: program instruction for applying a ray tracing algorithm through a stream processor; program instruction for determining a direct illumination transfer function for the point in real time; and program instruction for determining a secondary lighting contribution in real time through a series of multiply and add operations applied to data resulting from the ray tracing algorithm.

In another embodiment, a computer readable medium having program instructions for calculating a lighting function for an object to be rendered using a basis function is provided. The computer readable medium includes program instructions for calculating a transfer function approximation of the lighting function through a stream processor.

In yet another embodiment, a computing device, comprising a graphics processing unit (GPU) capable of determining lighting characteristics for an object in real time is provided. The lighting characteristics are defined through a basis function. The GPU includes a stream processor configured to split a stream of data associated with the lighting characteristics into multiple simultaneous operations.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1A:
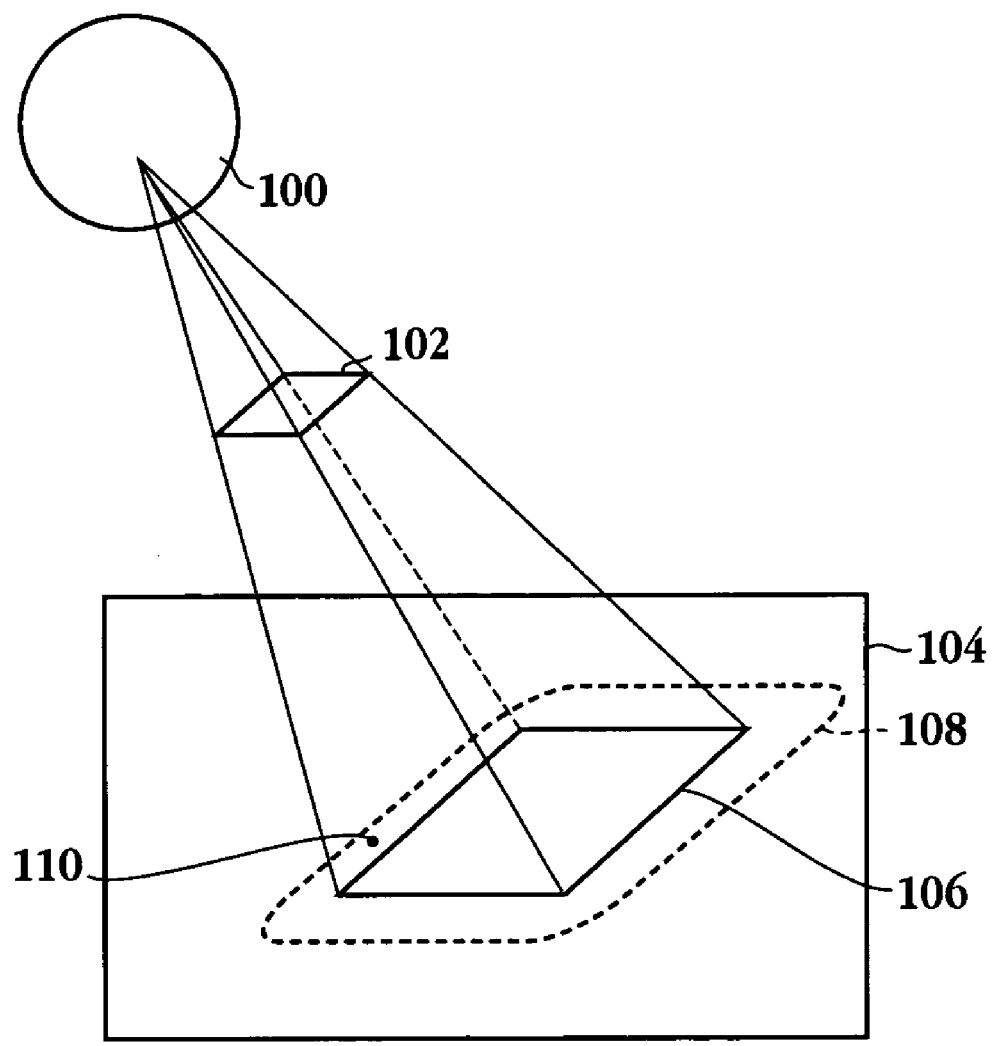
FIG. 1A is a schematic diagram representing an exemplary lighting computation scheme for rendering a display.
Figure 1B:
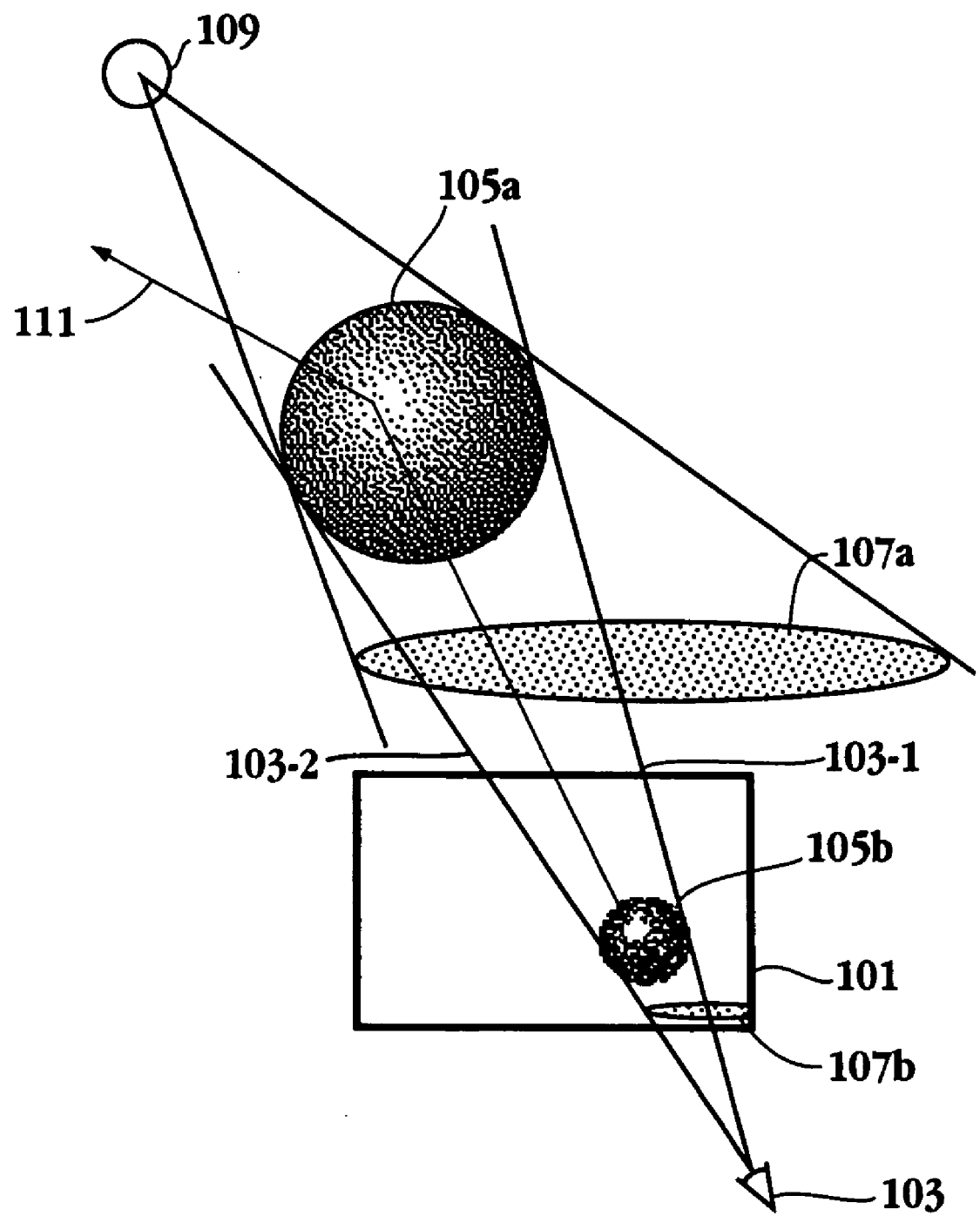
FIG. 1B is a simplified schematic diagram illustrating a ray tracing technique.

An invention is described for a system, apparatus and method that enables real time presentation of soft shadows for a video presentation, such as a video game, with minimal computationally intensive calculations. It will be obvious, however, to one skilled in the art, that the present invention may be practiced without some or all of these specific details. In other instances, well known process operations have not been described in detail in order not to unnecessarily obscure the present invention. FIGS. 1A and 1B are described in the "Background of the Invention" section.

The embodiments of the present invention provide a system and method for allowing real time presentation of realistic shadows during a video presentation, such as in a video game. In one embodiment, spherical harmonics, a mathematical system analogous to the Fourier transform but defined across the surface of a sphere simplify the rendering equation into a dot product over the spherical harmonic coefficients. In one embodiment, a representation of the incoming illumination is multiplied by a representation of surface reflectance, referred to herein as the transfer function (T). It will be apparent to one skilled in the art that the orthogonality of spherical harmonic functions provide that the integral of the function's products is the same as the dot product of functions respective coefficients. Therefore, the lighting function is collapsed to a dot product of the coefficients of a luminance function (also referred to as an illumination function) describing the incoming light from all directions and the coefficients of a transfer function describing the surface reflectance. The transfer function when dotted with luminance function, i.e., multiplied and integrated, yields the approximated lighting for a respective point. It should be appreciated that different types of transfer functions may be generated for diffuse surfaces, wherein the different types of transfer functions are associated with varying degrees of calculation complexity. Further information related to the different types of transfer functions and spherical harmonic lighting in general may be found in the article entitled "Spherical Harmonic Lighting: The Gritty Details", Robin Green, Jan. 16, 2003, which is hereby incorporated by reference for all purposes. It should be appreciated that the transfer and illumination functions described herein are capable of being defined over all directions using a parameterization of directions. The parameterization of directions may be spherical, cubical, cylindrical, etc. Additionally, the transfer and illumination functions may be expressed as the sum of any suitable basis functions. Exemplary basis functions include spherical harmonic basis functions, wavelet, lapped basis functions, etc., wherein each of these basis functions are orthogonal, orthonormal, or otherwise.

In one embodiment of the invention, the data captured through the transfer function is stored in memory along with texture map data. In one embodiment, a lighting basis function is sampled at the center of a texel and the resulting coefficient is stored, as opposed to calculating the lighting function at the corners of triangles. Thus, the need for interpolating from triangle vertices is eliminated. As will be explained in more detail below, a high resolution object is used to work out where the shadows are defined and the nature of the intensity of the shadows. That is, the self shadowing and the self interreflection properties of the image are captured through the transfer function. The use of a high resolution for the determination of the shadows allows for the data derived from the high polygon model to be stored and applied to a low polygon model in order to give a high resolution appearance to the low resolution image. In one embodiment, a one to one mapping between points in three dimensional space to points in two dimensional space enable a look-up operation for determining the corresponding pixel location associated with the stored transfer function data.

In another embodiment, the transfer function data is calculated in real time through the utilization of stream processors. A ray tracing scheme executed through the stream processors defines the direct illumination data. The secondary lighting defining the self transfer/self interreflection then becomes a series of multiply and add operations which are also suited for the stream processors of the graphics processing unit. Thus, soft shadows may be presented in real time for a video presentation, e.g., video game, movie, etc., as explained in more detail below.

Figure 2A:
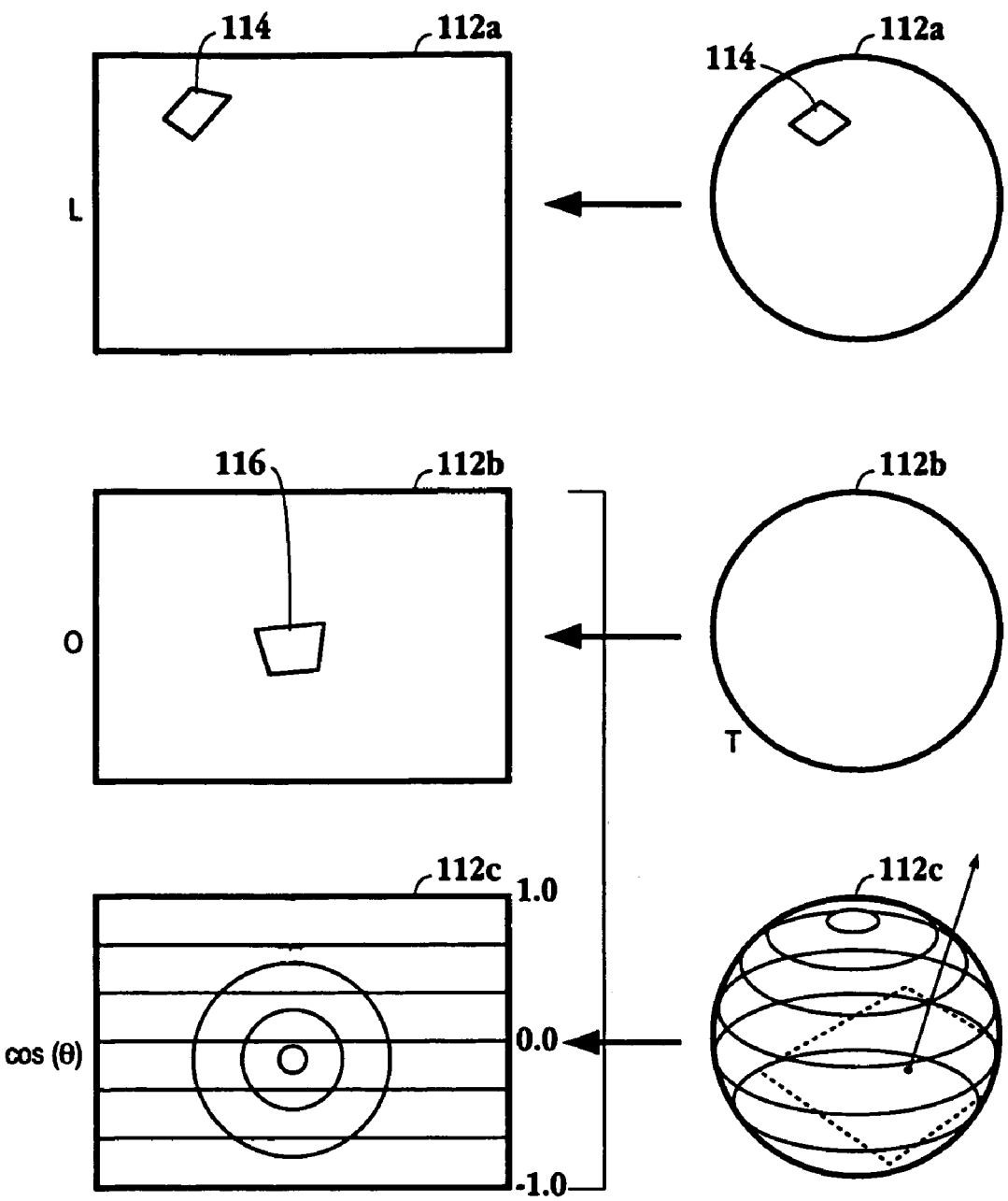
FIG. 2A is a simplified schematic diagram illustrating three components of a basis function used for eventual derivation of a lighting function in accordance with one embodiment of the invention.

FIG. 2A is a simplified schematic diagram illustrating three components of a basis function used for eventual derivation of a lighting function in accordance with one embodiment of the invention. The three components represent the illumination function (L), the occlusion function (O), and a cosine term ($\cos(\theta)$). It should be appreciated that surfaces 112a, 112b, and 112c each represent a surface of a corresponding globe which has been "unwrapped." The illumination function (L) component determines the amount incoming light to a particular point from light source 114. It should be further appreciated that surface 112a may be referred to as a theta to phi parameterization. The occlusion function (O) represents an area of the light source that is blocked, i.e., occluded from the point. Shadow area 116 illustrates the area that is blocked or occluded form the light source. The third term of the spherical function is the cosine term. The cosine term represents a ratio of light reflected off of a surface when illuminated from a specific direction. The cosine term is non-zero over the upper hemisphere of sphere 112c relative to the surface normal. The occlusion component and the cosine component may be combined to define the transfer function (T). The transfer function describes the lighting characteristics related to self transfer and self shadowing for a particular point on an object.

One skilled in the art will appreciate that spherical harmonics based functions are related to orthogonal polynomials, thereby allowing the representation of a function to be broken down to discrete polynomials through the summation of the terms of an equation. Furthermore, spherical harmonics based functions are rotationally invariant. That is, with reference to video games, using spherical harmonic based functions guarantee that during the animation of scenes, moving lights and rotating objects, the intensity of lighting will not fluctuate, crawl, pulse or have any other objectionable artifacts associated with other shading techniques. Furthermore, the addition of a light source does not require another complete calculation when utilizing spherical harmonics based functions for determining the lighting function.

As mentioned above, the transfer function (T), which includes the occlusion component and the cosine component, represents a description of the surface reflectance. The integration of the illumination function (L) and the transfer function (T) over an entire sphere may be simplified to a sum of dot products of their coefficients through the application of orthogonal basis functions. Accordingly, the lighting function may be collapsed into the multiplication of two different functions based on the rendering equation. Thus, a series of multiplication and addition operations resulting from this collapse of the lighting function enables for a relatively fast operation in the conversion of the integration over a sphere to determine lighting characteristics for an object being rendered. Consequently, the real-time presentation of realistic shading, as defined by the transfer function, may be implemented into a video game. Additionally, the basis functions provide soft shadows with a minimal amount of work and thereafter hard shadows may be defined through further calculation. Traditional approaches provide hard shadows initially and then require complex calculations to define the soft shadows. Further information on the spherical harmonic lighting technique, and spherical basis functions in general, is disclosed in the article entitled "Spherical Harmonic Lighting: The Gritty Details", Robin Green, Jan. 16, 2003, which has been incorporated by reference for all purposes. It will be apparent to one skilled in the art that the invention described herein may be utilized with any suitable basis function and is not limited to the spherical harmonic functions described herein. For example, a wavelet decomposition may be used as well as spherical basis functions. It will be apparent to one skilled in the art that a wavelet is an additional way of representing a signal from frequencies. The basis functions may be defined across any parameterization of the directional domain, for example, a spherical, a hemispherical, a cubical, a conical or a cylindrical parameterization. Additionally, these basis functions may be orthogonal, orthonormal, lapped or otherwise.

Figure 2B:
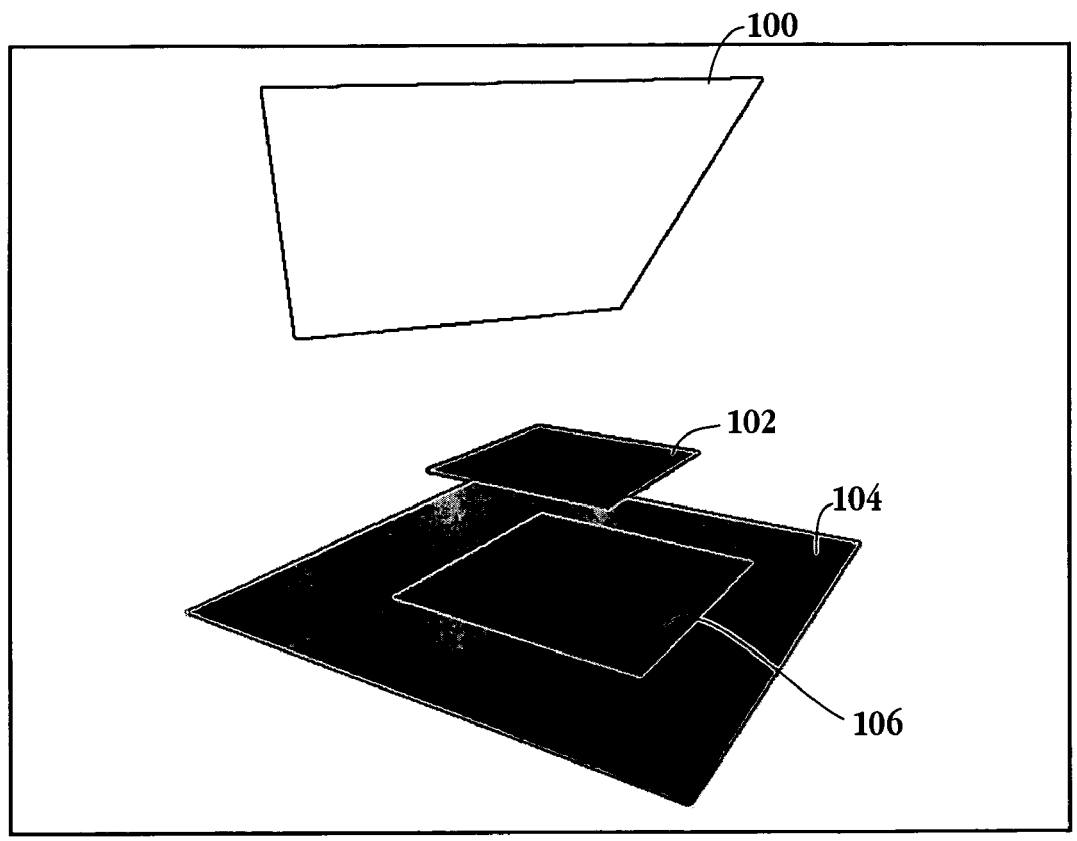
FIGS. 2B–2G are simplified schematic diagrams for alternatively representing the components of a basis function for use in deriving a lighting function.
Figure 2C:
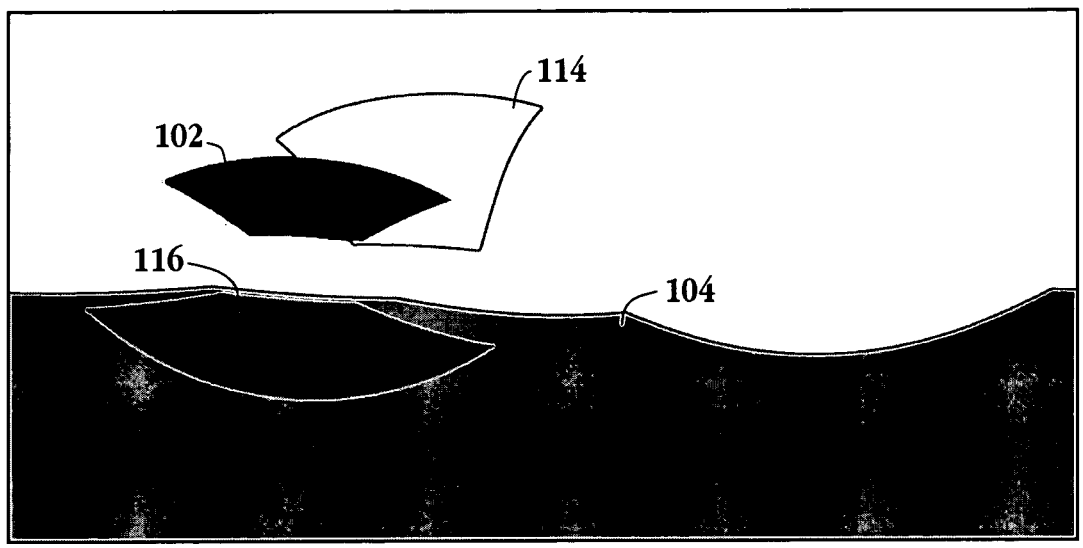
Figure 2D:
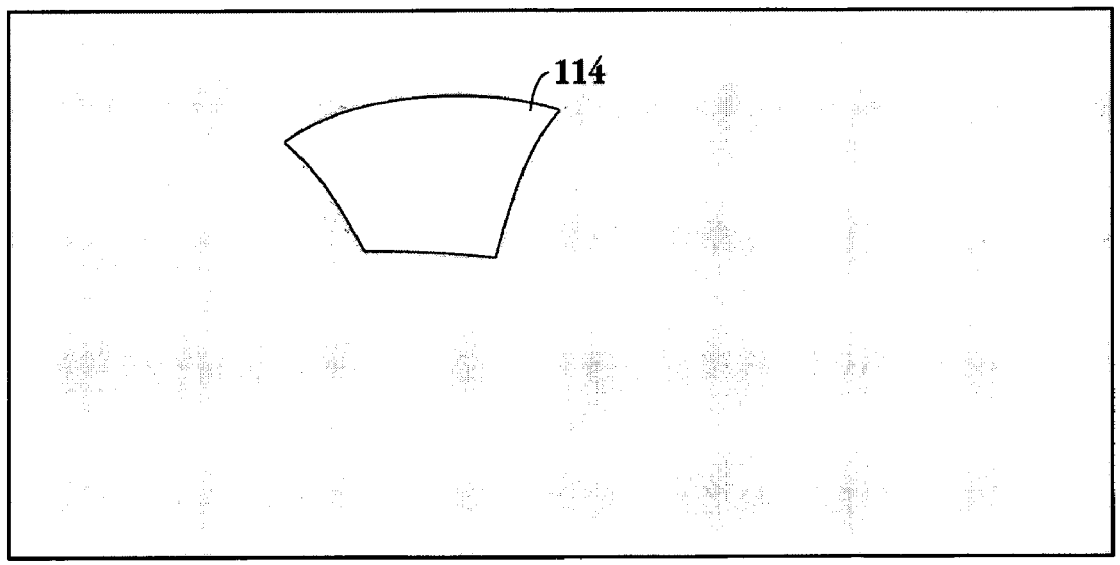
Figure 2E:
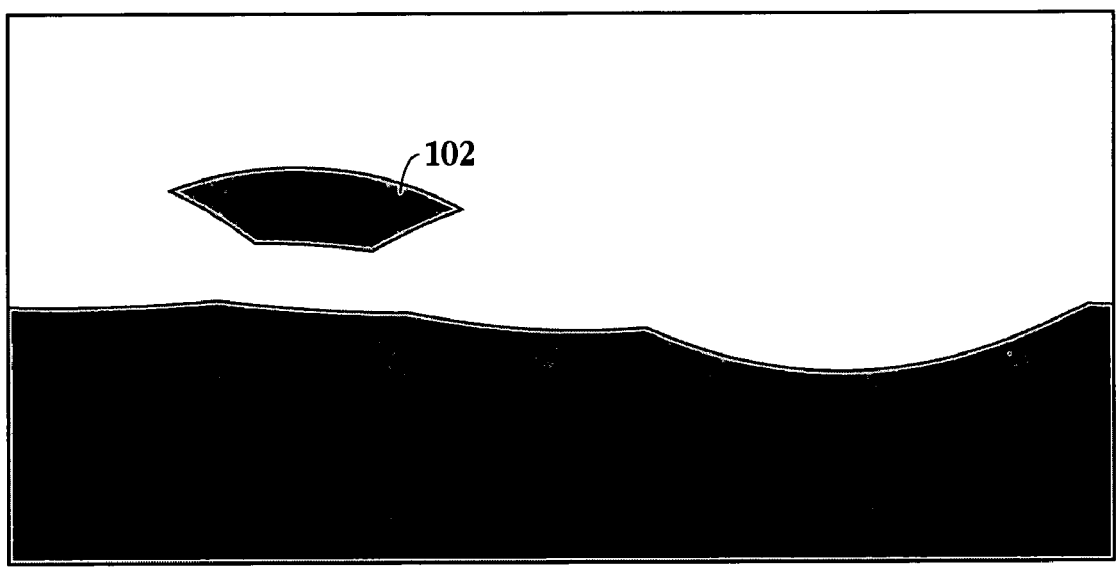
Figure 2F:
Figure 2G:
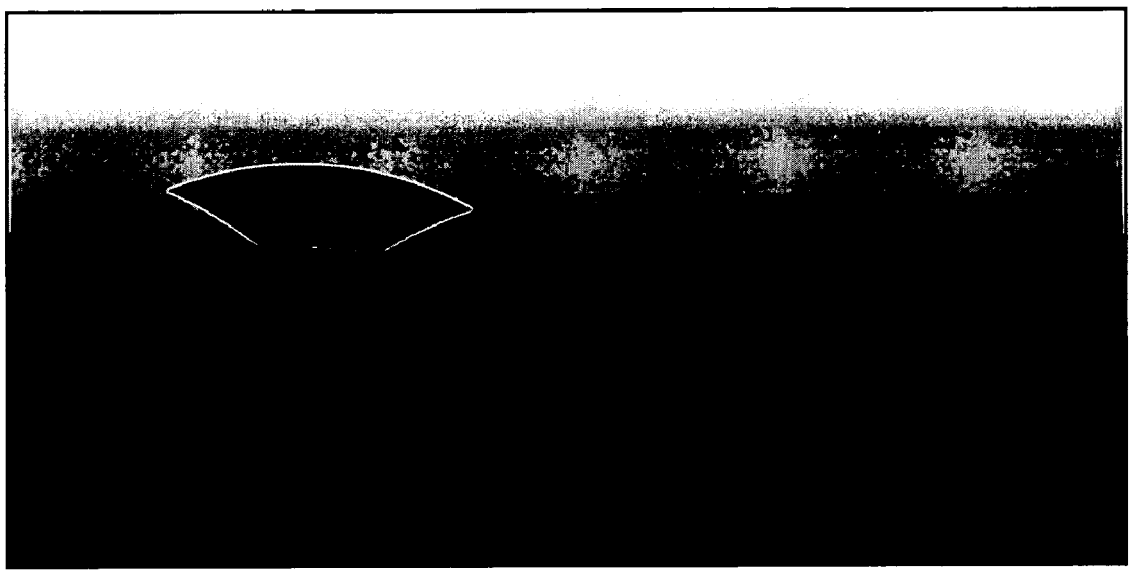

FIGS. 2B–2G are simplified schematic diagrams for alternatively representing the components of a basis function for use in deriving a lighting function. Here, FIGS. 2B–2G provide an alternative representation to FIG. 2A. FIG. 2B includes light source 100, occlusion surface 102 blocks a portion of the light thereby defining umbra 106 on surface 104. Thus, in FIG. 2B there are no soft shadows defined. FIG. 2C represents a point on surface 104 being lit, as represented through an unwrapped spherical function. FIG. 2D represents the lighting function (L) component of the spherical function. FIG. 2E represents the visibility function, also referred to as the occlusion function (O). FIG. 2F represents the cosine term (cos(θ)). It should be appreciated that the basis function for the lighting characteristics may be expressed as the product of the lighting function represented by FIG. 2D, the visibility function represented by FIG. 2E, and the cosine term represented by FIG. 2F. FIG. 2G represents the transfer function. One skilled in the art will appreciate that the transfer function representation of FIG. 2G excludes the lighting function of FIG. 2D, i.e., the transfer function is a combination of the visibility function of FIG. 2E and the cosine term of FIG. 2F.

Figure 3:
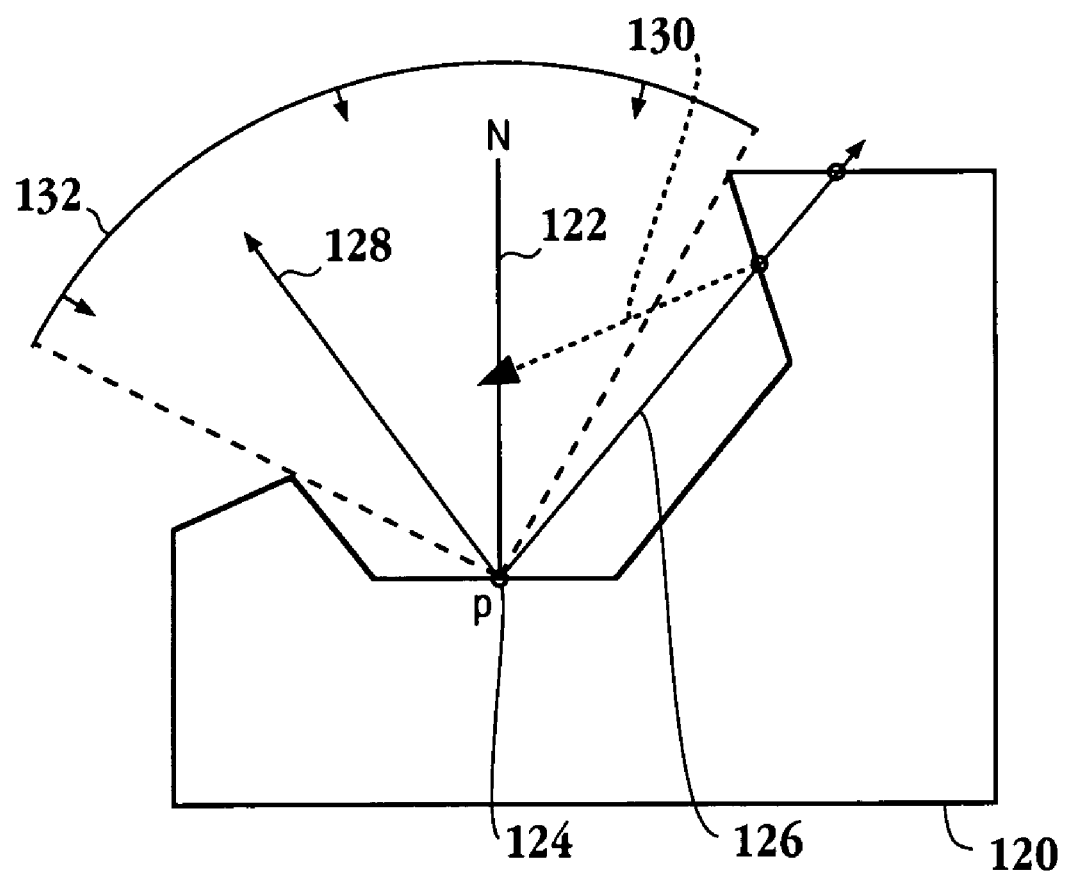
FIG. 3 is a schematic diagram illustrating a polygon wherein ray tracing techniques are used to define a lighting function at points on a surface of the polygon in accordance with one embodiment of the invention.

FIG. 3 is a schematic diagram illustrating a polygon wherein ray tracing techniques are used to define a lighting function at points on a surface of the polygon in accordance with one embodiment of the invention. Point P 124 is on a surface of polygon 120. The normal 122 to P is also shown. Here, rays are traced from a point, e.g., point P 124, through the polygon database in order to define any hits. For example, ray 126 is traced from point P 124 and will eventually hit a side of polygon 120 and reflect as illustrated by ray 130. On the other hand, ray 128 does not hit any sides of polygon 120, i.e., is visible to the outside world. Arc 132 represents the amount of the outside world that point P can see. The ray tracing information distributes light, i.e., self-transfer. The self-transfer, also referred to as self-interreflection, is determined by the rays representing light being bounced off the surfaces of polygon 120 to further illuminate the region. In addition, it should be appreciated that with each bounce off of a wall of the polygon the associated light ray will lose a certain amount of energy. Further information on ray tracing techniques may be found in the article entitled "Spherical Harmonic Lighting: The Gritty Details" referenced above.

Figure 4A:
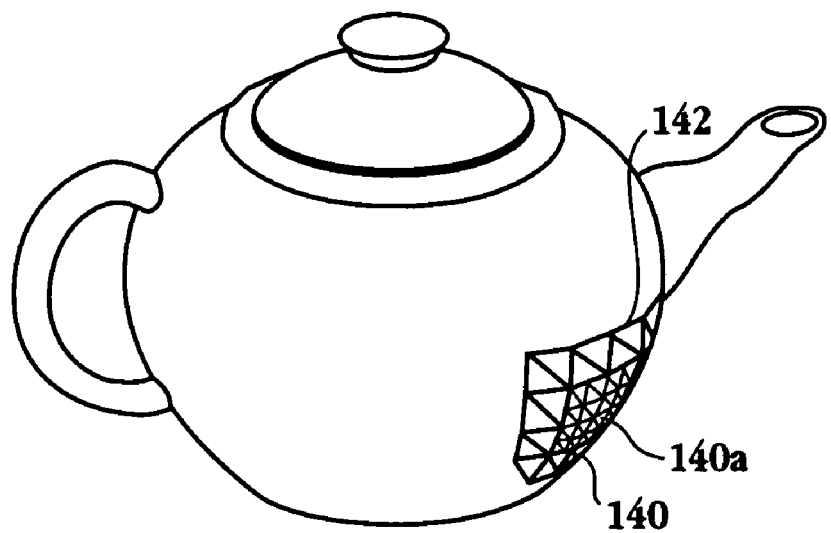
FIG. 4A is a simplified schematic diagram of the use of Gouraud shading.

FIG. 4A is a simplified schematic diagram of the use of Gouraud shading. As is known, Gouraud shading uses a number of triangles in order to smoothly interpolate the shading of a region. Here, region 140 is shown with a plurality of small triangles in order to more accurately capture the shading in the region. However, region 142 consists of larger triangles where it is not necessary to capture the amount of shading to a great detail in that area. In order to provide an accurate shading picture, Gouraud shading requires that many small triangles be defined in the particular area. The lighting characteristics at each of the corners of the triangles are calculated and then through linear interpolation the shading for the entire triangle is determined.

Figure 4B:
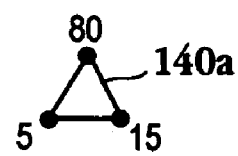
FIG. 4B illustrates a schematic diagram illustrating the process of linear interpolation.

FIG. 4B illustrates a schematic diagram illustrating the process of linear interpolation. The corners of triangle 140a may be associated with values representing the lighting at each of the corners of triangle 140a. Thus, in one corner, the value of eighty is represented while in another corner a value of fifteen, and in a third corner, a value of five is represented. Through linear interpolation the shading of the entire triangle is then determined by the relative weights of each corner, i.e., a point closer to the corner having a weight of eighty will have a value more closely related to eighty. It should be appreciated that the computation of the polygons, i.e., triangles, is intensive and precludes the real-time presentation shading for video games due to the computations required for presenting soft shadows. Furthermore, when a light source is added or changed, the entire calculation must be repeated in order to render the image.

Figure 5:
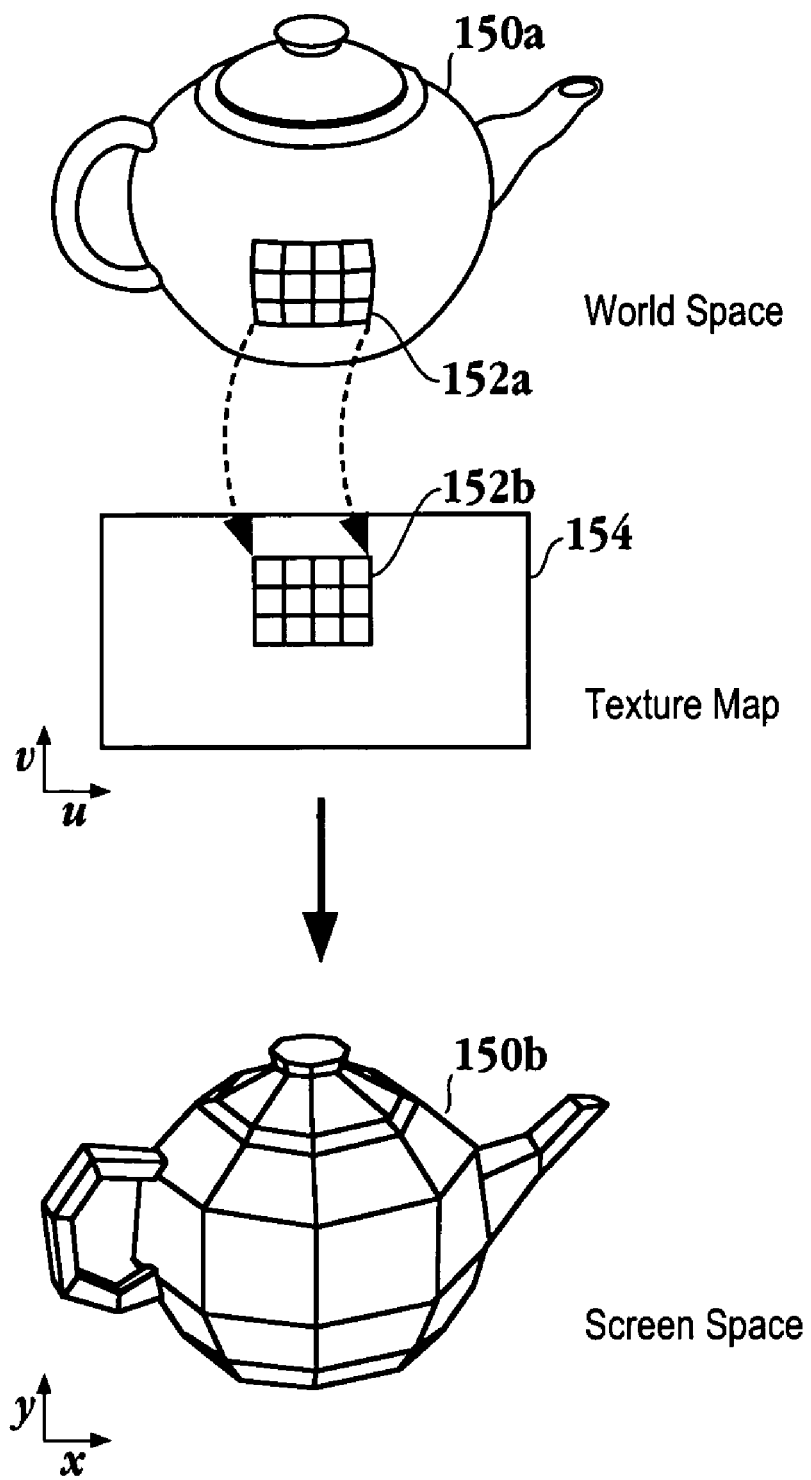
FIG. 5 is a schematic diagram illustrative of a scheme for embedding lighting coefficients into a texture map in accordance with one embodiment of the invention.

FIG. 5 is a schematic diagram illustrative of a scheme for embedding lighting coefficients into a texture map in accordance with one embodiment of the invention. Object 150*a*, or more specifically, the points that make up object 150*a*, are projected from world space, also referred to as 3-dimensional space, to texture map 154. For example, region 152*a* of object 150*a* is mapped from three dimensional space to texture map 154 coordinate space, which is generally represented as (u,v) coordinates. Thus, region 152*b* in texture map space corresponds to region 152*a* in three dimensional space. The (u,v) coordinates of the texture map are correlated to screen space for rendering object 150*b* on a display screen. In one embodiment, the texels, which define texture map 154, include data representing the lighting characteristics associated with the texel. In another embodiment, the spherical harmonic lighting function, as described in the article entitled "Spherical Harmonic Lighting: The Gritty Details," which has been incorporated by reference, is sampled at the center of each texel and the resulting coefficients or values are stored in memory. Thus, for each texel, the occlusion and cosine functions, which make up the transfer function (T), may be cached in memory of a computing device. Consequently, the illumination source (L) may be determined and the lighting function becomes a dot product of the cached transfer function (T) value and the illumination source (L). With respect to video games the computing device may be a video game console, e.g., the "PLAYSTATION 2"® manufactured by Sony Computer Entertainment Inc.

It should be appreciated that there is no need to calculate polygons as is required with traditional shading schemes such as Gouraud shading. Through the application of spherical basis functions, such as spherical harmonic functions, the speed of rendering become independent of the size and number of light structures. In particular, with respect to video games, light sources are constantly changing. Accordingly, a value for the illumination function (L), representing the light source(s) is readily determined and combined with the stored transfer function value to provide real-time shading for an application. That is, the transfer function (T) value remains constant and is calculated once and stored. It should be appreciated that the stored transfer function value corresponds to a multi-directional signal which may be defined through ray-tracing in one embodiment of the invention.

Figure 6:
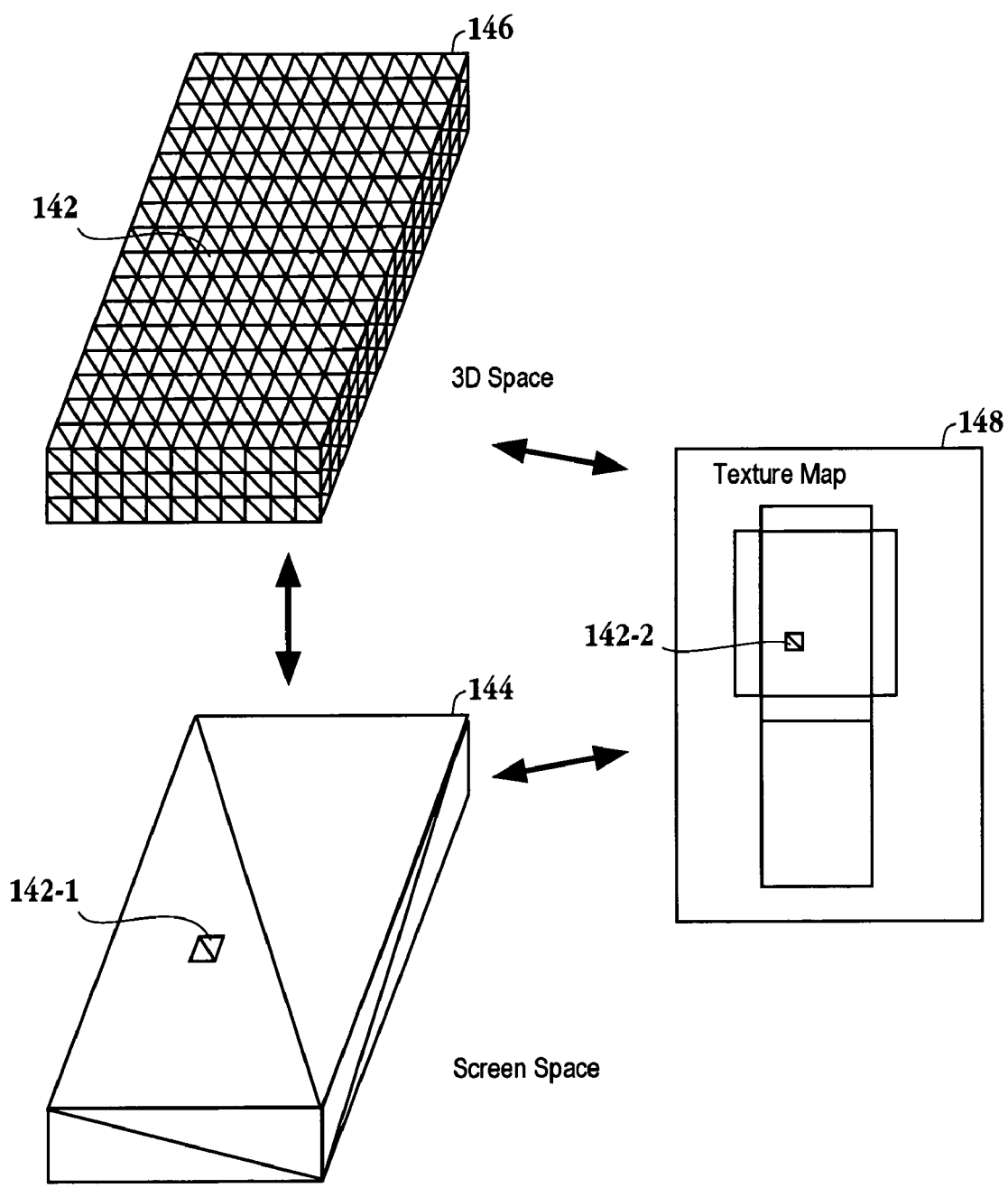
FIG. 6 is a schematic diagram illustrating the interrelationship between the two dimensional and three dimensional coordinate spaces encountered for the real-time shading display of an object in accordance with one embodiment of the invention.

FIG. 6 is a schematic diagram illustrating the interrelationship between the two dimensional and three dimensional coordinate spaces encountered for the real-time shading display of an object in accordance with one embodiment of the invention. As mentioned above, the lighting characteristic, i.e., shadow properties, for an image are enabled to be presented in real time by inserting lighting function data with each texel of a texture map. The lighting function data captures the self shadowing and the self interreflection characteristics through the application of the transfer function (T). In one embodiment, a high resolution rendition of an object is used to capture the lighting function data. The lighting function data is then stored and applied to a low resolution model. The low resolution model is made to appear as having a high resolution when the lighting function data is applied to the low resolution model.

Still referring to FIG. 6, object 142 is a high resolution rendition in three dimensional space. In order to provide the high resolution, a large number of polygons 142, e.g., thousands of polygons, are defined on object 146. A one-to-one mapping of the points in three dimensional space to points in two dimensional space is performed. Thus, the texels defined by texture map 148 correlate to the points on object 142 through this mapping. For example, texel 142-2 may correspond to polygon 142. As is generally known, texturing may be analogized to wrapping a three dimensional object in two dimensional gift paper. As discussed above with reference to FIG. 5, texel 142-2 is associated with data representing a lighting characteristic, e.g., transfer function, derived from a spherical basis function. Thus, when rendering a two dimensional image 144 of three dimensional object 146 in screen space, a low resolution image is given the appearance of a high resolution image. That is, data representing the lighting characteristics of a high resolution image defined by thousands of polygons are captured by texture map 148. The captured lighting characteristics are then projected from texture map 148 to two dimensional image 144 that is presented on a display screen. As can be seen in FIG. 6, image 144 is a low resolution image defined by 12 polygons (6 polygons being shown). However, the lighting characteristics, e.g., shading, shadows, etc., for image 144 are derived from image 146 defined by thousands of polygons. Accordingly, these lighting characteristics may be projected onto a low resolution image to provide a high resolution appearance.

Figure 7:
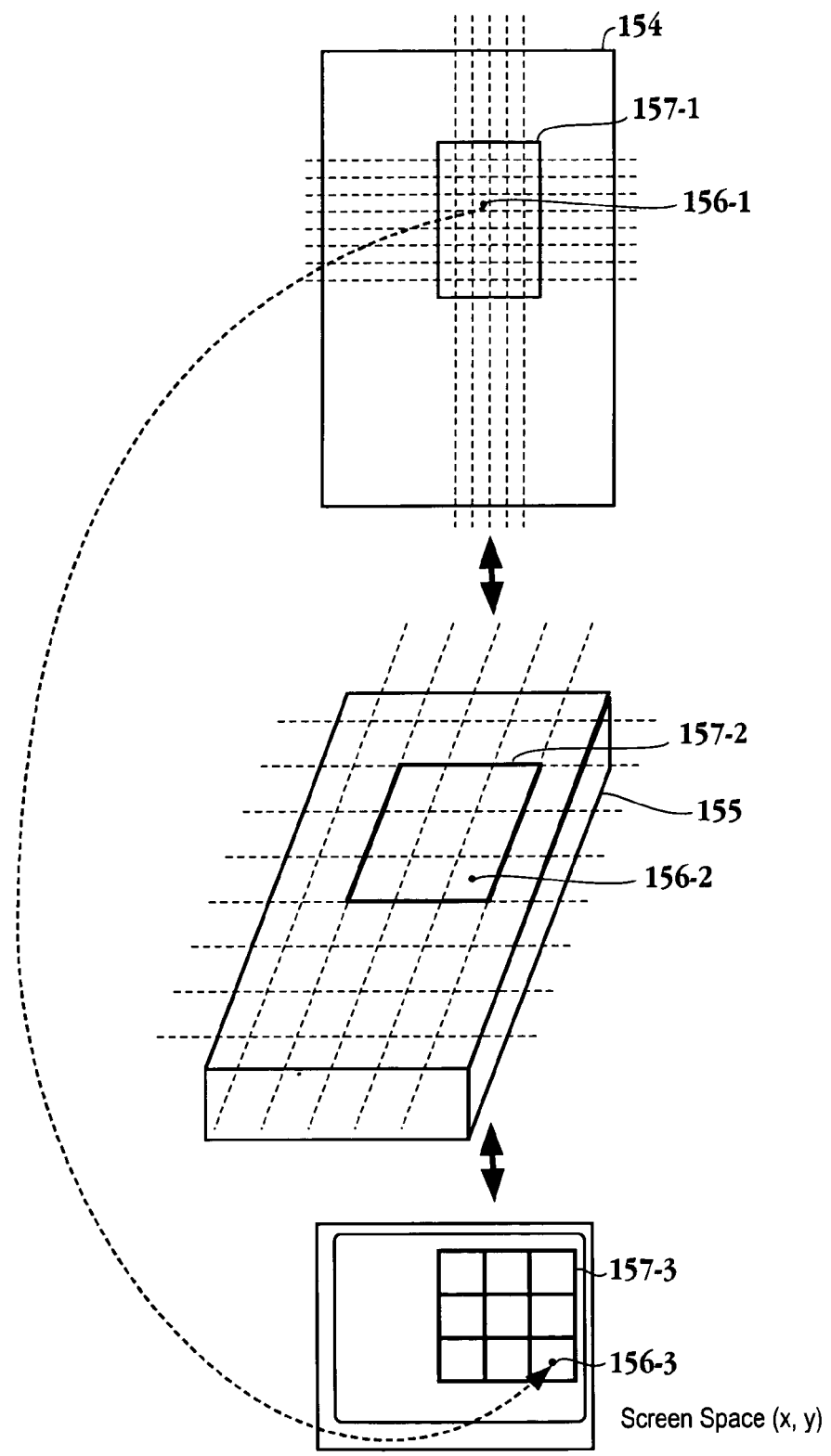
FIG. 7 is a schematic diagram illustrating an alternative representation of the three coordinate spaces of FIGS. 5 and 6.

FIG. 7 is a schematic diagram illustrating an alternative representation of the three coordinate spaces of FIGS. 5 and 6. Texture map 154 includes region 157-1 defined by a plurality of texels. Each texel may include lighting characteristic data for the corresponding texel, wherein the lighting characteristic data is retrievable, i.e., stored in memory with the texel data. For example, point 156-1 represents lighting characteristic data described above that is embedded into the corresponding texel. The lighting characteristic data is derived from the application of a spherical basis function to image 155. As discussed above with reference to FIG. 6, image 155 of FIG. 7 may be a high resolution image, i.e., defined by numerous polygons. Region 157-1 of texture map 154 corresponds to region 157-2 of three dimensional image 155. In addition, the lighting characteristic data represented by point 156-1 is derived from application of a spherical basis function to determine the self shadowing, i.e., the occlusion function, and the self interreflection. It will be apparent to one skilled in the art that the occlusion function determines the visibility, i.e., self-shadowing for a respective point P. The self interreflection data is calculated through ray tracing in one embodiment of the invention. When rendering image 157-3 on a display screen, a look-up of the lighting characteristic data, e.g., the transfer function data, is performed. A dot product between the transfer function (T) data and the illumination function (L) data is calculated to arrive at the intensity for the corresponding pixel, which is then displayed.

It should be appreciated that while FIGS. 6 and 7 illustrate a one to one correspondence between texels and pixels, (142-2 and 142-1, respectively, of FIG. 6, and 156-1, 156-2, and 156-3, respectively, of FIG. 7) the invention is not limited to this relationship. That is, multiple texels may correspond to one pixel, e.g., minification, and alternatively one texel may correspond to multiple pixels, e.g., magnification. Additionally, these resampling operations may be filtered to avoid aliasing artifacts.

Figure 8:
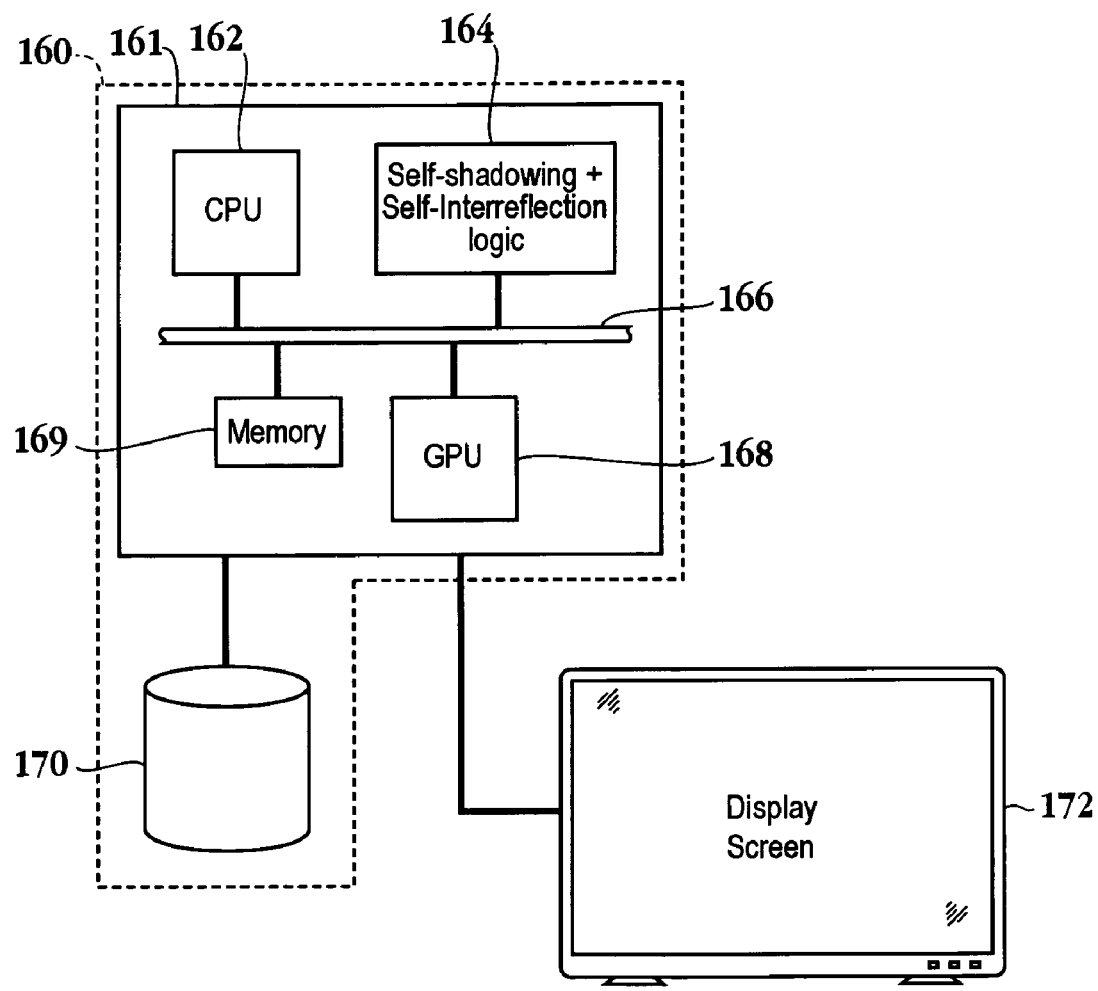
FIG. 8 is a simplified schematic diagram of the computing device capable of providing real time self-shadowing and self-interreflection for objects of an image in accordance with one embodiment of the invention.

FIG. 8 is a simplified schematic diagram of the computing device capable of providing real time self-shadowing and self-interreflection for objects of an image in accordance with one embodiment of the invention. Computing device 160 includes chip 161. Chip 161 includes central processing unit (CPU) 162, memory 169, and graphics processing unit (GPU) 168. In addition, self-shadowing and self-interreflection logic 164 is in communication with CPU 162, memory 169, and GPU 168 over bus 166. Self shadowing and self interreflection logic 164 performs functionality to enable real-time presentation of lighting characteristics by applying the pre-processed lighting and self shadowing effects of a high resolution model to a low resolution model as described herein. It should be appreciated that the pre-processed transfer function data describing a respective light field may be stored in memory 169 along with the texture map data. Computing device 160 includes storage medium 170, which is configured to alternatively store a texture map having texels that include data describing the light field as spherical harmonic coefficients or any other values associated with a suitable spherical basis function. Thus, through a rendering operation where the stored data is combined with the illumination data, an intensity of a pixel associated with a location corresponding to the stored data is calculated. It should be appreciated that the rendering is simplified to a dot product of the coefficients associated with the illumination data and the transfer function data, which in turn, defines a relatively fast calculation. Display screen 172 presents the image defined by computing device 160 using the rendered data. In one embodiment, computing device 160 may be a any suitable video game console, such as the "PLAYSTATION 2"® manufactured by Sony Computer Entertainment Inc. With respect to on-line gaming applications, computing device 160 may be a server.

Figure 9:
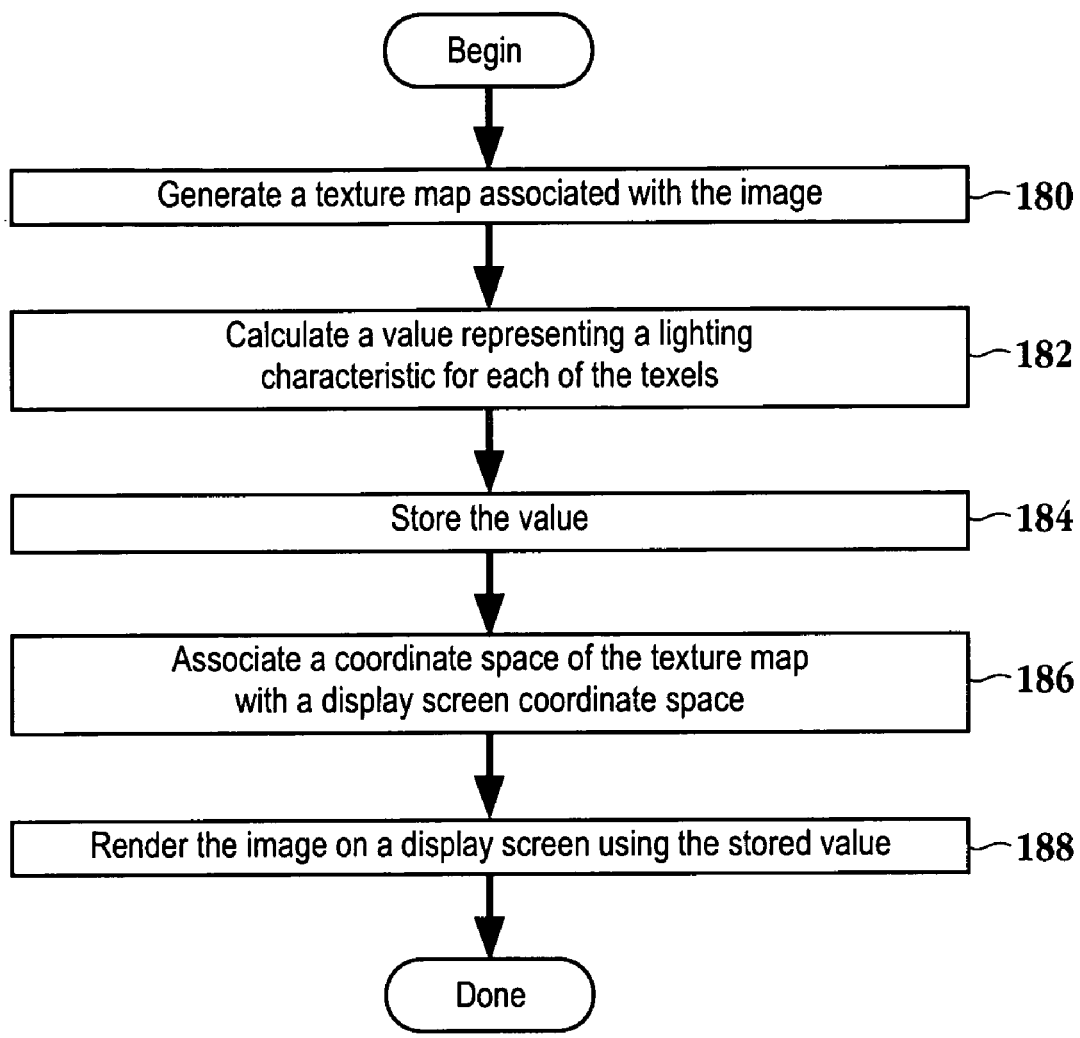
FIG. 9 is a flow chart diagram of the method operations for rendering a low resolution image with high resolution lighting characteristics in real-time in accordance with one embodiment of the invention.

FIG. 9 is a flow chart diagram of the method operations for rendering a low resolution image with high resolution lighting characteristics in accordance with one embodiment of the invention. The method initiates with operation 180 where a texture map associated with the image is generated. The texture map defines a plurality of texels. The method then advances to operation 182 where a value representing a lighting characteristic for each of the texels is calculated. In one embodiment, a spherical harmonic function may be applied as described above and in the article entitled "Spherical Harmonic Lighting: The Gritty Details", which has been incorporated by reference, to calculate the value representing the lighting characteristic. In another embodiment, the value is represented by a number of coefficients corresponding to a transfer function (T) defined using directional basis functions. As described above, the transfer function (T) accounts for the self shadows and self interreflection data. In other words, the transfer function represents the surface reflectance. Of course, a value associated with any suitable basis function may represent the lighting characteristics here, e.g., a wavelet, a spherical basis function, etc. The method then proceeds to operation 184 where the value calculated in operation 182 is stored on any suitable storage medium. In one embodiment, a value is calculated for each texel of the texture map, e.g., a center point of each texel. The method then moves to operation 186 where a coordinate space of the texture map is associated with a display screen coordinate space. It will be apparent to one skilled in the art that a number of readily-available techniques are provided in order to associate the coordinates of the texture space with the screen coordinate space. The method then advances to operation 188 where the image is rendered on a display screen. Here, the image appears as a high resolution image as described above.

Figure 10:
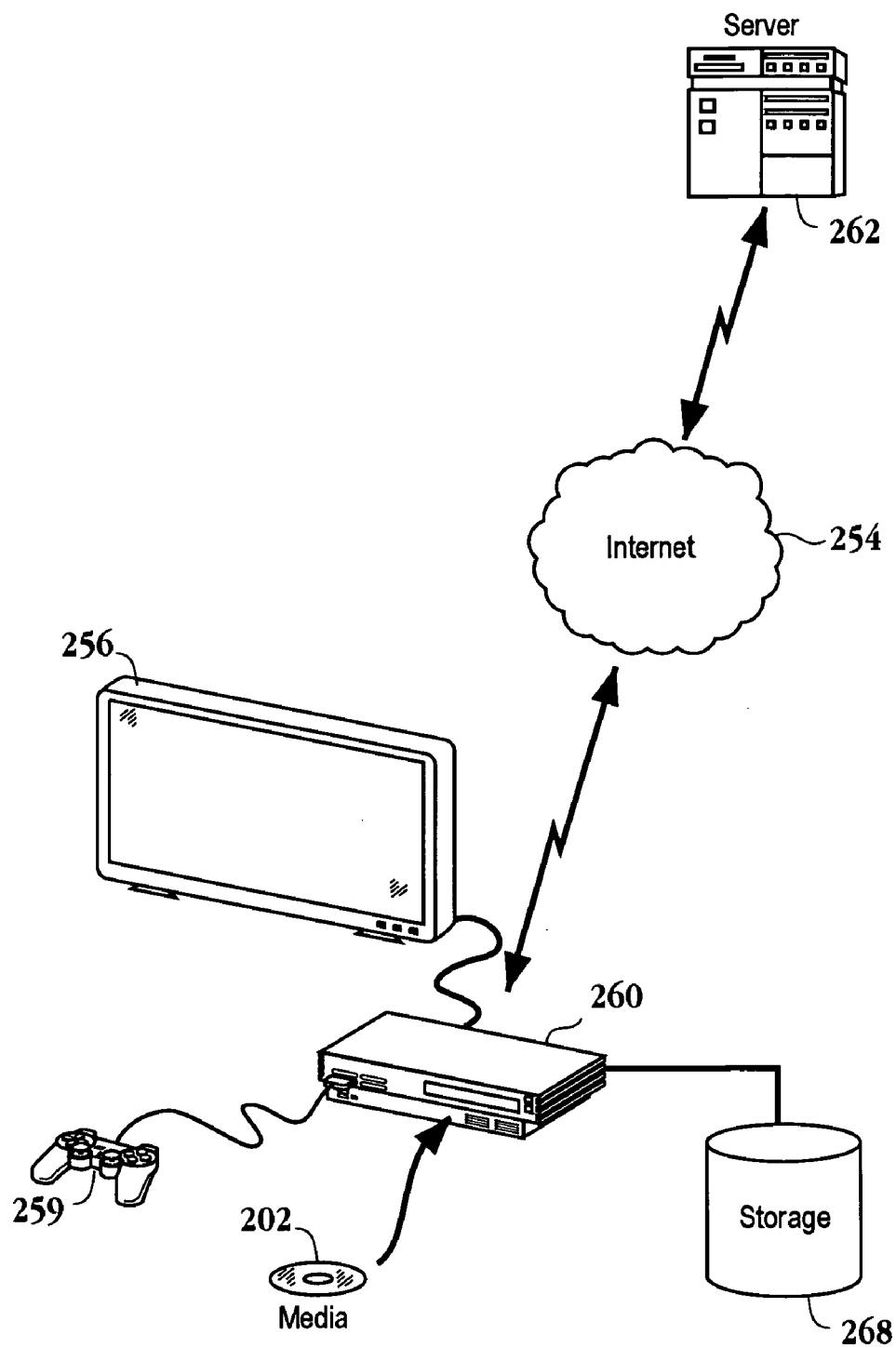
FIG. 10 is a schematic diagram illustrating an on-line gaming application in accordance with one embodiment of the invention.

FIG. 10 is a schematic diagram illustrating an on-line gaming application in accordance with one embodiment of the invention. Game console 260 is shown connected to server 262 through the Internet 254, using any wired or wireless connection. Server 262 may be one or more servers. Controller 259 is in communication with game console 260, which in turn is in communication with display screen 256. Game console 260 includes storage 268 and is configured to accept computer readable media 202. It should be appreciated that the integrated circuit described with reference to FIG. 8 may reside on server 262 or game console 260. Alternatively, software performing the functionality described above may similarly reside on server 262 or game console 260.

Figure 11:
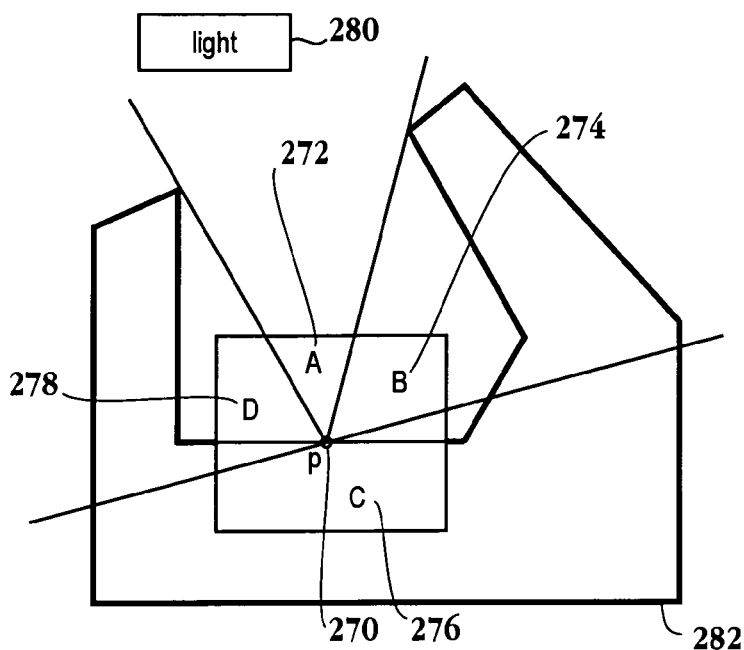
FIG. 11 is a simplified schematic diagram illustrating a polygonal rendering system.
Figure 12A:
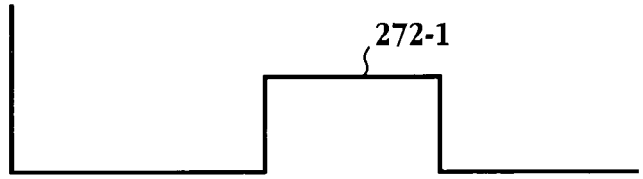
FIGS. 12A through 12D represent graphs illustrating the amount of light perceived for each of the above-specified quadrants of FIG. 11.
Figure 12B:
Figure 12C:
Figure 12D:

FIG. 11 is a simplified schematic diagram illustrating a polygonal rendering system. Here, the polygonal rendering system renders four views from point P 270. It will be apparent to one skilled in the art that the polygonal rendering system may be analogized to positioning a camera at point P 270 and pointing the camera in four directions, illustrated by quadrants 272, 274, 276, and 278 (A, B, C, and D, respectively). One skilled in the art will appreciate that the number of pixels set to white and the number of pixels set to black are added in order to obtain the integral. For example, FIGS. 12A through 12D represent graphs illustrating the amount of light perceived for each of the above-specified quadrants (A, B, C and D) of FIG. 11. In FIG. 12A, region 272-1 corresponds to quadrant 272 in FIG. 11. Since light from light source 280 of FIG. 11 is not blocked by object 282, region 272-1 of FIG. 12A represents the incoming light received at point P. FIGS. 12B and 12C are the graphs corresponding to quadrants 274 and 276, respectively. Since quadrants 274 and 276 are not able to receive light from light source 280, FIGS. 12B and 12C represent a pixel being set to black. FIG. 12D corresponds to quadrant 278. Since a small amount of light enters into quadrant 278, region 278-1 which indicates a white pixel for the region where light from light source 280 is visible. It should be appreciated that the polygonal rendering system wastes a lot of computing power as compared to a ray tracing scheme due to the large number of polygons defined within a small pixel space.

One skilled in the art will appreciate that the rendering process can take place using either of two types of illumination models, namely, direct or global illumination. Direct illumination models account for light reflecting directly from the light sources to the viewer within a view plane via one direct reflection from the surface, while global illumination models also model the reflection of light to the viewer after multiple reflections between surfaces. The polygon rendering pipeline is typically used to produce images of scenes which have been built up from objects defined as a collection of polygonal planar faces. The polygon pipeline may use a direct illumination model and handle curved surfaces by splitting them into polygonal planar facets. However, in order to simulate a more realistic display global illumination must be used. For example, ray-tracing methods may be used to model the specular reflections and refractions of light in a scene. As is generally known, ray tracing models inter-object reflections and light transmissions. However, this modeling comes at a high computational cost where complex scenes with many objects may take hours to compute. As will be explained in more detail below, the use of a stream processor in combination with directional basis functions minimizes the work, i.e., computation, that is necessary in order to approximate the global illumination effects in real time.

Figure 13A:
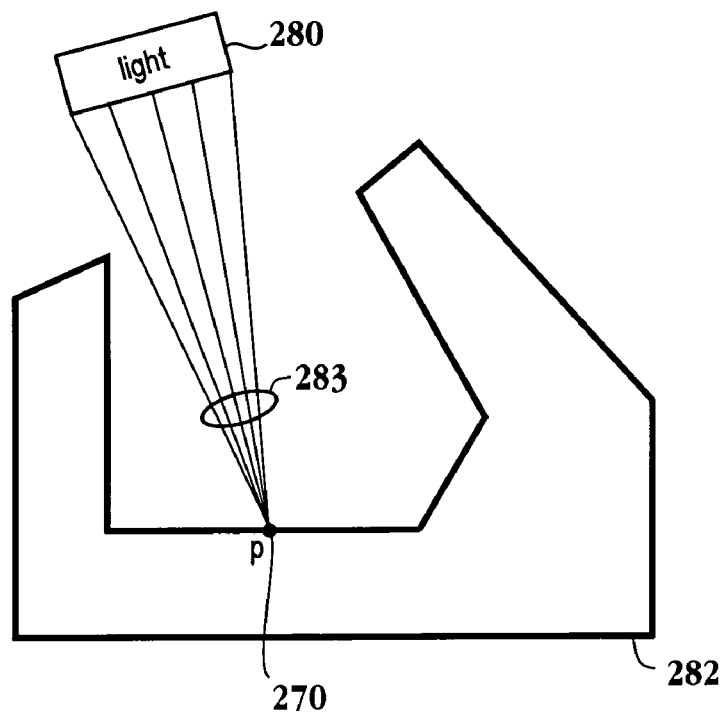
FIG. 13A is a simplified schematic diagram illustrating a biased approximator for use in illustrating a direct illumination component in accordance with one embodiment of the invention.

FIG. 13A is a simplified schematic diagram illustrating a biased approximator for use in illustrating a direct illumination component in accordance with one embodiment of the invention. Here, a coherent bundle of rays 283 are fired from point P to light source 280. If light source 280 is the only light source, then rays 283 are fired only at light source 280. The biased approximator, also referred to as importance sampling, manages where rays are fired, i.e., strategically computing the firing of the rays. Thus, computing power is not wasted by shooting rays in every direction in order to determine a direct illumination component of the lighting function. That is the strategic shooting of the rays manages the amount of computing power required. It should be appreciated that the rays are dependent on where point P 270 is located, therefore, pre-calculation is not an option here as the coherent bundle of rays is different for each point on the surface of object 282. However, where self-transfer and self-interreflection shading components are required in order to provide a more realistic image an unbiased approximator is used.

Figure 13B:
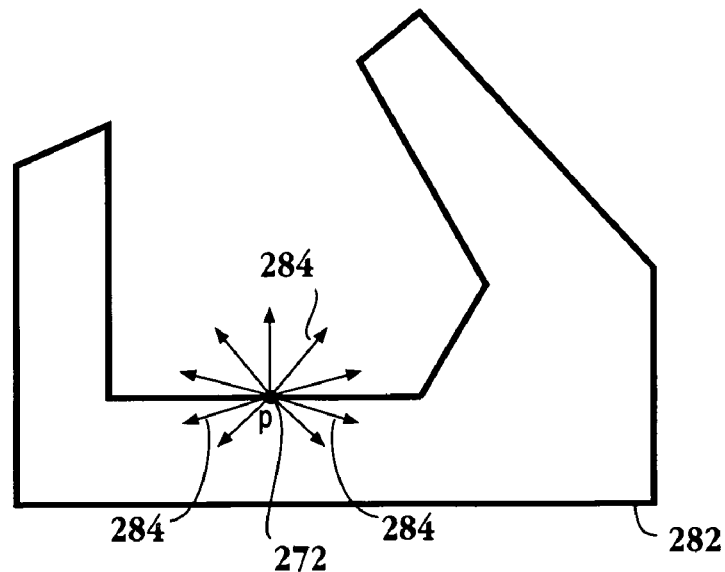
FIG. 13B is a simplified schematic diagram illustrating an unbiased approximator used for determining a lighting function in accordance with one embodiment of the invention.

FIG. 13B is a simplified schematic diagram illustrating an unbiased approximator used for determining a lighting function in accordance with one embodiment of the invention. The unbiased approximator fires rays 284 in all directions from point P 272. Here, the same pattern of rays are used each time, thereby allowing data associated with the pattern of rays to be stored in a table and accessed as necessary. Thus, light reflected from surfaces of object 282 is captured in order to find secondary in tertiary lighting.

Figure 14:
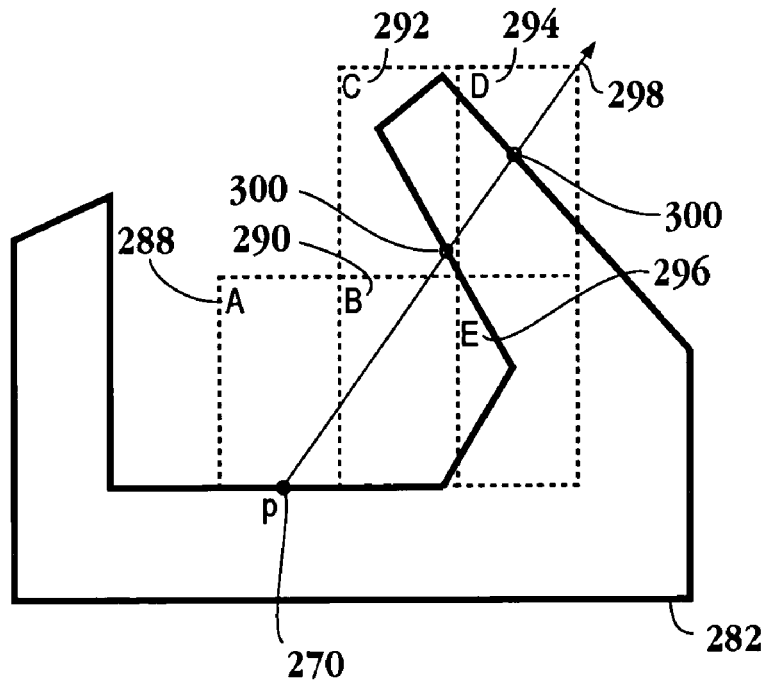
FIG. 14 is a simplified schematic diagram illustrating a ray tracing technique executed through stream processors in accordance with one embodiment of the invention.

FIG. 14 is a simplified schematic diagram illustrating a ray tracing technique executed through stream processors in accordance with one embodiment of the invention. Here, ray 298, also referred to as a shadow feeler is fired from point P 270. Ray 298 traverses a number of voxels, e.g., voxel A 288, voxel B 290, voxel C 292, and voxel D 294, but not voxel E 296. Through the read and write capability provided by a stream processor, it is possible to record which polygons intercept the volume of pixels (voxel) in space. As will be explained in more detail below, it is verified if ray 298, each segment of ray 298 within a voxel, intersects a surface. For example, the first segment of ray 298 in voxel A 288 does not intersect any surface, i.e., the surface being intersected is behind or after voxel A. Therefore, the second segment of ray 298 in voxel B 290 is checked. Here again, the second segment does not intersect the surface, i.e., the surface being intersected is behind or after voxel B. Next, the segment within voxel C 292 is examined and it is determined that at point 302 ray 298 intersects with a surface of object 282. Where, the direct illumination component is being calculated, once an intersection is found, the scheme may move to a next ray and repeat the process described above.

In one embodiment, in order to determine a self-transfer portion of the lighting function, it is necessary to ascertain whether point 302 is the closest hit to point P. For example, since there is another intersection with the object at point 300 of voxel D 294 it may be determined whether point 302 is closer to point P than point 300, when ray tracing associated with self-transfer is being performed. One skilled in the art will realize that because voxels include one or two polygons the amount of computing can be vastly limited. Furthermore, a transfer function component for each ray segment may be computed as the ray is being traced, i.e., in real time. Where, the direct illumination is being calculated, once an intersection is found, the scheme may move to a next ray and repeat the process described above. That is, rather than using a stream processor for visibility calculations, the stream processor is being used to approximate a transfer function using basis functions. The object will then be rendered according to a typical rendering scheme, such as Gouraud shading. In one embodiment, the transfer function can be worked out for every frame, every other frame, or some other suitable periodic time. It should be appreciated that where ray 298 intersects in voxel C 292 in a suitable parameterization. Here again, the desired result has been obtained when only testing a minimal amount of polygons, and it is possible to move to the next ray.

The grid ray tracing schemes described with reference to FIGS. 14 and 15 may be executed through a graphics processing unit (GPU) having flow control which includes vertex programs. The vertex programs are programmable bits of code which are capable of performing calculations. That is, the vertex program enable parallel processing. Thus, 16, 32, 64, etc. rays may be processed simultaneously. The programming enables conditionals for making decisions and the ability to store data based on the conditional. In addition, the programming further enables the ability to read and write values. The programmable bits of code may be referred to as stream processors. Thus, instead of using the stream processors for visibility calculations, i.e., what pixels you can see on the screen, the ray tracing engine in conjunction with the stream processors may be used to perform the lighting calculation. That is, work out the transfer function as described above thereby eliminating the need to perform the preprocessing operations described above, since the calculations may now be performed in real time. The transfer function component for half of a frame may be worked out for a first frame and the other half of the transfer function may be worked out for a next frame. Alternatively, the transfer function for a specific object in a frame may be worked out or some other suitable permutation may be performed. Thus, the embodiments described herein enable on demand ray tracing using the stream processors for performing lighting calculations. As a result, the transfer function may be changed at run time as opposed to being pre-calculated and then being fixed.

It should be appreciated that while FIG. 14 illustrates a single point P 270, in actuality a number of points on the surface of the object may need to be recalculated or re-lit. Through the strategic placement of the rays, a minimum number of rays associated with calculating the direct illumination component may be generated per each frame depending on the available computing power. Then, the secondary, tertiary, etc., bounces of light may be determined through the use of the stream processors again. As the ray tracing was completed with respect to the direct illumination component, the geometric part of the calculation is completed. What remains is the distribution of the light, which breaks down to a series of multiply and add operations, and is ideally suited for the stream processors of the GPU.

Figure 15:
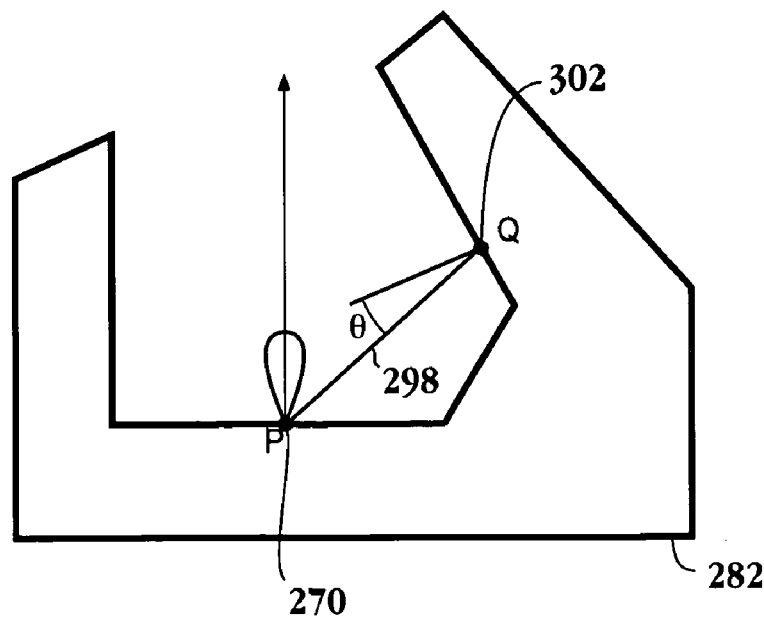
FIG. 15 is a simplified schematic diagram illustrating a technique of determining secondary and tertiary light effects in accordance with one embodiment of the invention.

FIG. 15 is a simplified schematic diagram illustrating a technique of determining secondary and tertiary light effects in accordance with one embodiment of the invention. As mentioned above, the geometry has been previously done, therefore, a dot product calculation is all that remains. That is, a series of multiply and add operations are performed through the stream processor in order to obtain the secondary in tertiary lighting characteristics. Thus, the most efficient way to calculate a lighting function in real time is to apply a ray tracing algorithm in a graphics processing unit and re-distribute the light by doing the multiply and addition operations through a stream processor associated with the graphics processing unit. Thus, on demand ray tracing is available which does lighting calculations only and does not do visibility. Furthermore, the computing power may be distributed over a number of frames rather than being done every frame. Ray 298 has previously been traced from point P 270 and recorded through the ray tracing program. The light received at point Q 302 is a function of the cosine of the angle relative to the normal times the light energy delivered to point Q. It will be apparent to one skilled in the art that the redistribution of the light is simply a dot product, i.e., multiply and add operations, which determine the self transfer component of the lighting function.

Figure 16:
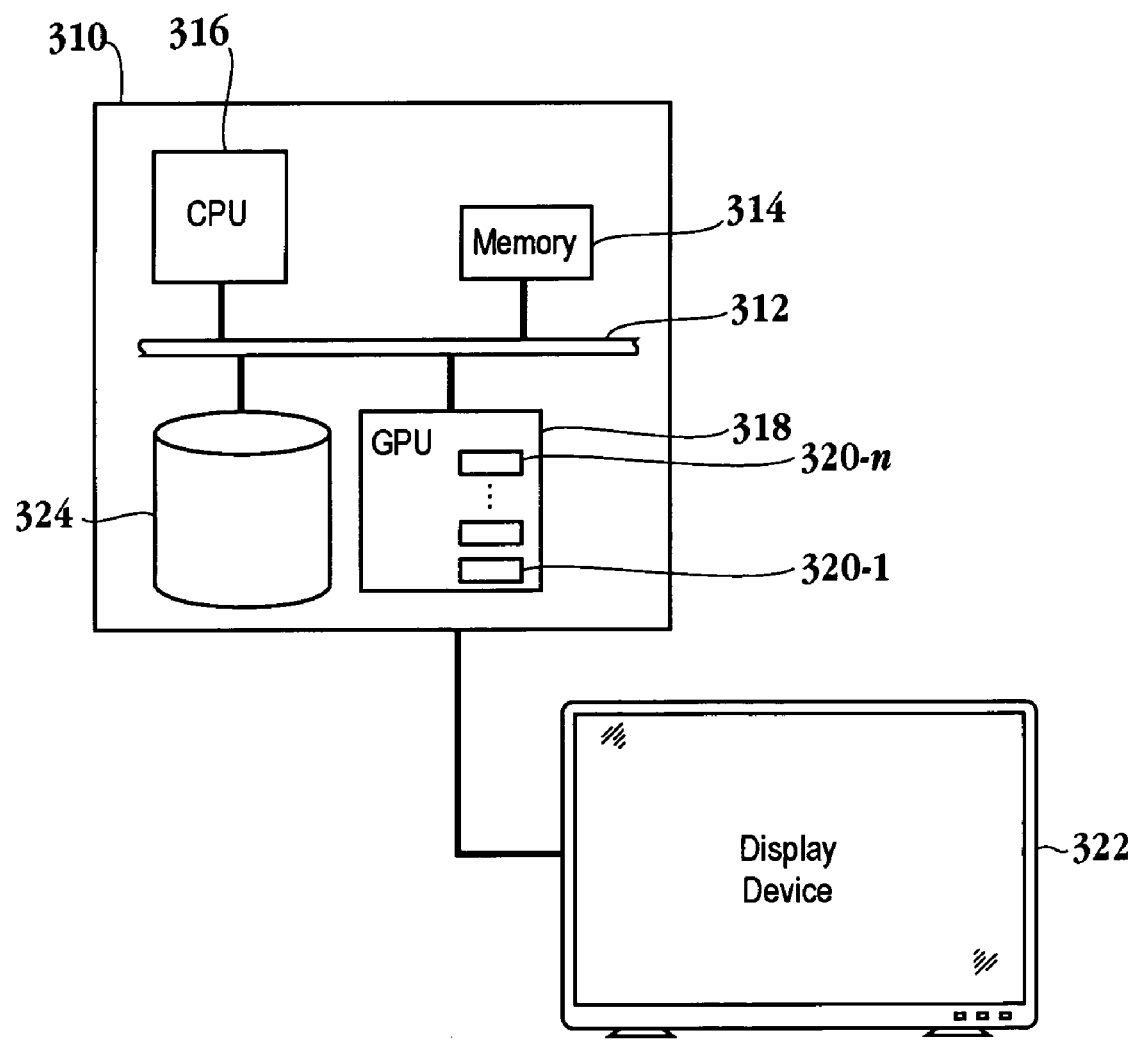
FIG. 16 is a simplified schematic diagram of the components of a computing device capable of calculating global illumination for an image to be displayed in real time in accordance with one embodiment of the invention.

FIG. 16 is a simplified schematic diagram of the components of a computing device capable of calculating global illumination for an image to be displayed in real time in accordance with one embodiment of the invention. Memory 314, CPU 316 and GPU 318 are in communication with each other over bus 312. GPU 318 includes stream processors 320-1 through 320-n. In one embodiment, stream processors 320-1 through 320-n are programmable hardware that takes one stream of instructions, i.e., data, and splits that stream into a number of simultaneous operations. In one embodiment, a program is replicated multiple times and the same program is run on each of the stream processors. It should be appreciated that each program may or may not stop at the same point. In another embodiment, computing device 310 is a video game console. Computing device 310 includes storage media 324. Display device 322 is in communication with computing device 310 and is configured to display image data.

Figure 17:
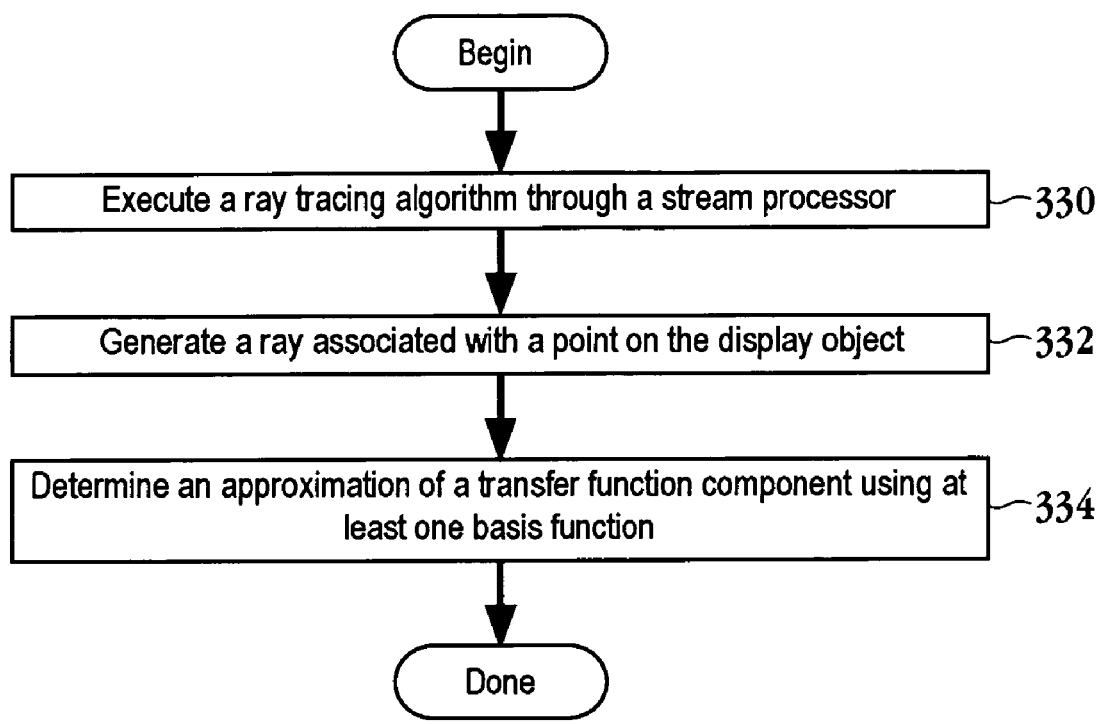
FIG. 17 is a flow chart diagram illustrating the method operations for presenting lighting characteristics associated with a display object in real time in accordance with one embodiment of the invention.

FIG. 17 is a flow chart diagram illustrating the method operations for presenting lighting characteristics associated with a display object in real time in accordance with one embodiment of the invention. The method initiates with operation 330 where a ray tracing algorithm is executed through a stream processor. Here, the stream processor is capable of parallel processing multiple rays simultaneously. The method then advances to operation 332 where a ray associated with a point on the display object is generated. The ray generation may be associated with either an unbiased or a biased approximator. The method then proceeds to operation 334 where an approximation of a transfer function component is determined using at least one basis function. Here, the transfer function component is combined with a lighting source component in order to determine the approximation of the transfer function component, which include soft shadows, to be applied to an image when it is displayed. Of course, the transfer function component may be a lighting characteristic associated with the ray. Additionally, the method operation of determining the approximation of the transfer function component using the at least one basis function may be repeated for a series of basis functions to render the display object. One skilled in the art will appreciate that the method described with reference to FIG. 17 may be applied to a plurality of rays.

Figure 18:
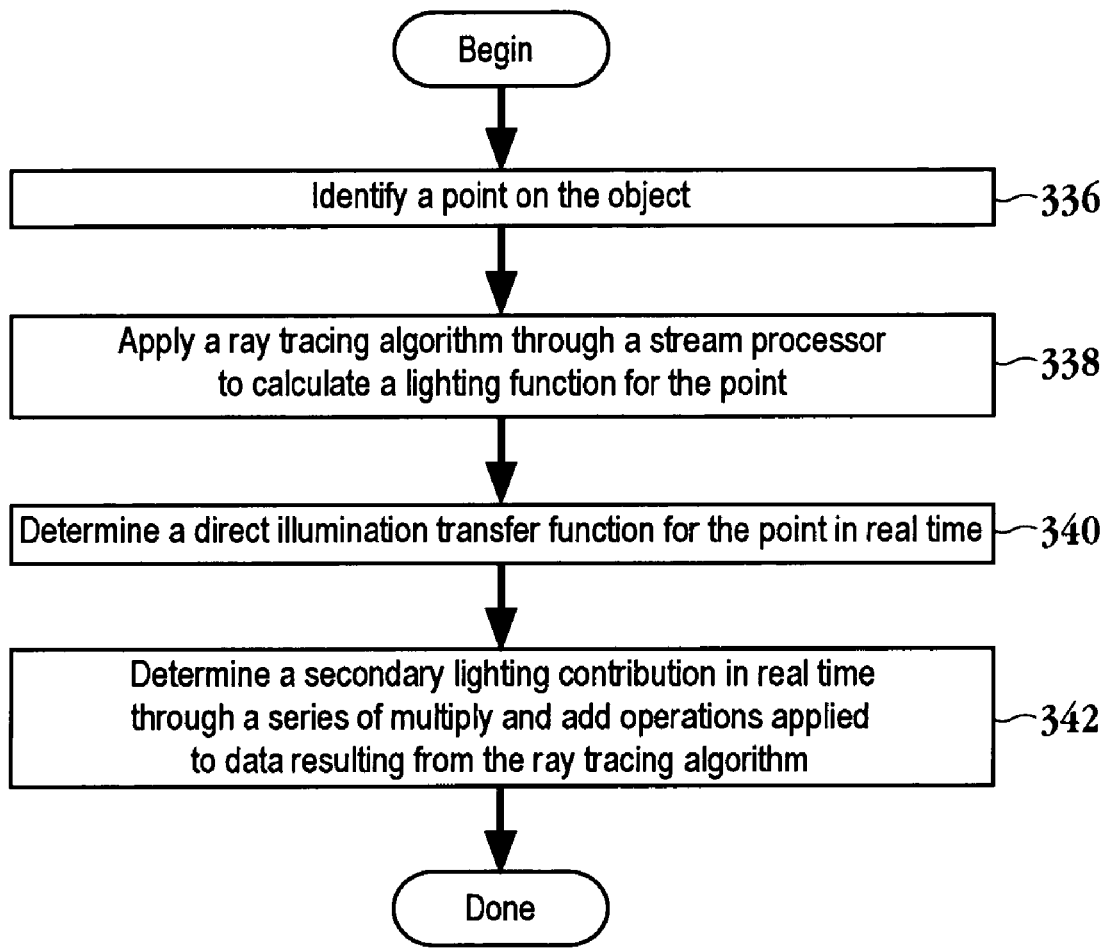
FIG. 18 is a flow chart diagram illustrating the method operations for calculating a transfer function component associated with a spherical harmonic function for rendering shading characteristics of an object in real time in accordance with one embodiment of the invention.

FIG. 18 is a flow chart diagram illustrating the method operations for calculating an approximation to a transfer function defined by at least one basis function for rendering shading characteristics of an object in real time in accordance with one embodiment of the invention. The method initiates with operation 336 where a point on the object is identified. The method then advances to operation 338 where a ray tracing algorithm is applied through a stream processor in order to calculate a lighting function for the point. The stream processor is capable of tracing multiple rays simultaneously as described above. The method then moves to operation 340 where a direct illumination component of the lighting function is determined for the point in real time. It should be appreciated that as a result of performing the ray tracing, the geometry associated with the object and the object's environment is determined. The method then proceeds to operation 342 where a secondary lighting contribution is determined in real time through a series of multiply and add operations applied to data resulting from the ray tracing algorithm. As a result of determining the geometry, the data for the multiply and add operations are readily available. Therefore, the stream processor of the GPU may be used to perform the multiply and add operations very efficiently in order to determine the transfer function in real time. Consequently, preprocessing data to determine a fixed transfer function becomes unnecessary.

It will be apparent to one skilled in the art that as spherical harmonic (SH) function work in frequency space, the SH function is well suited for low frequency shadowing. That is, SH functions perform less work to determine soft shadows as compared to hard shadows. Classic path tracing techniques point sample a light source, often through importance sampling to provide soft shadows after blending the result of many samples. SH transfer functions are independent of the light source and may be trivially relit by any SH projected high dynamic range spherical illumination function. Furthermore, when global illumination techniques needs to interreflect light between diffuse surfaces, the ray tracer must calculate the direct illumination function at a secondary point visible from the source position, which requires many rays, i.e., is not possible in real time. However, for SH lighting, the data associated with the direct illumination function has been calculated previously and may be applied to arrive at the transfer function for the interreflection. Therefore, no more ray tracing is necessary, i.e., the lighting characteristics may be presented in real time as the computational power is achievable through the stream processors. For example, a graphics processing unit having vertex shading and floating point data types enables general purpose stream processing of large arrays of data efficiently.

In summary, the above described invention describes a method and a system for providing realistic shading for a video presentation in real time. The embodiments described above, pre-process the data using a basis function such as spherical harmonic lighting techniques. The pre-processed data, derived from the calculation of a transfer function, is associated with texture map data and stored in memory. In one embodiment, the transfer function yields data that is rotationally invariant. The stored data is then accessed and combined with an illumination value representing the incoming light, to define realistic shading for the image. In one embodiment, the pre-processed data is associated with a high resolution image, i.e., an image defined by thousands of polygons. Thus, when the shading defined by the pre-processed data is applied to a low resolution image presented on a display screen, the low resolution image appears to have a high resolution.

It should be appreciated that the embodiments described herein may also apply to on-line gaming applications. That is, the embodiments described above may occur at a server that sends a video signal to multiple users over a distributed network, such as the Internet, as described with reference to FIG. 10. The video signal defines images having realistic lighting characteristics that may be generated in real-time. Furthermore, the embodiments described herein define a scheme for utilizing stream processors to perform the lighting calculation only and then using typical computer graphics rendering to place the image on the screen.

As mentioned above, the characteristics of spherical harmonic lighting enable soft shadows to be defined with minimal work. A transfer function defines the surface reflectance so that self transfer components may be represented. Through the use of stream processors, the transfer function may be calculated in real time so that a video game may more realistically define shadows during a presentation. That is, the above embodiments use GPU programs for ray tracing to calculate a SH global illumination solution in object space through a relatively low number of rays per vertex, which effectively performs lighting calculations at each vertex. The resulting spherical harmonic encoded transfer functions are interreflected and rendered using Gouraud shaded triangles to reconstruct the lighting function between the sample points. In another embodiment, the movie industry may apply the embodiments described herein to pre-visualization operations to provide real-time information. As mentioned above, any suitable basis function parametarized over some domain of directions, e.g., a wavelet or an orthonormal basis function may be utilized as the embodiments described herein are not limited to spherical harmonics.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium includes electromagnetic wave carriers. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer implemented method for presenting lighting characteristics associated with a display object in real-time during a video presentation through a single graphics processing unit, comprising:
   (a) executing a ray tracing algorithm through a stream processor, the executing including;
      (i) generating a ray associated with a point on the display object toward a light source using a biased approximator for determining a direct illumination component toward a light source;
   (b) determining an approximation of a transfer function component using at least one basis function, the determining identifies whether the ray is within a view plane of the light source, the approximation of the transfer function component producing lighting characteristics data is stored along with texture map data, the approximation corresponding to a center point of a texel associated with a corresponding point on the display object, and storing coefficients resulting from the approximation, the coefficients represent surface reflectance, and wherein conducting the approximation corresponding to the center point of the texel eliminates calculation of the transfer function component at corners of triangles, thus avoiding interpolation of triangle vertices;
   (c) multiplying the coefficients that are stored by the direct illumination component to define approximated lighting for the point on the display object; and
   (d) rendering the approximated lighting for the point of the display object on a screen.

2. The computer implemented method of claim 1, wherein the texel is defined as one of multiple texels correspond to one pixel for minification, or one texel corresponds to multiple pixels for magnification.

3. The computer implemented method of claim 1, repeating operations (a)–(d) for multiple points of the display object so as to render the display object over one or more frames of a series of video frames.

4. The computer implemented method of claim 1, wherein if the ray is not within the view plane of the light source, then the method includes,
   determining a self interreflection component of the lighting characteristic.

5. The computer implemented method of claim 1, further comprising:
   repeating the determining of an approximation of a transfer function component for a series of basis functions; and
   the rendering the display object using the approximation of the transfer function component for the series of basis functions.

6. A computer implemented method for calculating an approximation to a transfer function defined by at least one basis function for rendering shading characteristics of an object in real time during a video presentation, comprising:
   (a) identifying a point on the object;
   (b) calculating a lighting function for the point, the calculating including;
      (i) applying a ray tracing algorithm through a stream processor;
      (ii) determining a direct illumination transfer function through a biased approximator for the point in real time; and
      (iii) determining a secondary lighting contribution in real time during the video presentation, the secondary lighting contribution identified through a series of multiply and add operations, resulting in coefficients that represent surface reflectance; and
      (iv) combining the coefficients that represent the surface reflectance with the direct illumination transfer function to render the shading characteristics of the object in real time for display on a screen, wherein each operation is performed within a single graphics processing chip.

7. The computer implemented method of claim 6, wherein the secondary lighting contribution is determined from a center point of a texel without processing corners of triangles, thus avoiding interpolation of triangle vertices.

8. The computer implemented method of claim 6, further comprising:

repeating the identifying of (a) and the calculating of (b) for multiple points on the object.

9. The computer implemented method of claim 8, wherein the method operation of repeating the identifying of (a) and the calculating of (b) for multiple points on the object includes,
- (c) performing the calculating for a portion of the multiple points during a first frame of image data, and
- (d) performing the calculation for a remainder of the multiple points during a next frame of image data.

10. A computer readable medium embodying program instructions for calculating an approximation to a transfer function defined by at least one basis function for rendering shading characteristics of an object in real time during a video presentation, comprising:
- program instruction for identifying a point on the object;
- program instruction for calculating a lighting function for the point, the program instruction for calculating including;
  - program instruction for applying a ray tracing algorithm through a stream processor;
  - program instruction for determining a direct illumination transfer function through a biased approximator for the point in real time; and
  - program instruction for determining a secondary lighting contribution in real time, the secondary lighting contribution identified through a series of multiply and add operations, resulting in coefficients that represent surface reflectance; and
  - program instruction for combining the coefficients that represent the surface reflectance with the direct illumination transfer function to render the shading characteristics of the object in real time for display a screen, wherein each of the programming instructions are executed through a single graphics processing chip.

11. The computer readable medium of claim 10, further comprising:
- program instruction for repeating the identifying and the calculating for multiple points on the object.

12. The computer readable medium of claim 11, wherein the method operation of repeating the identifying and the calculating for multiple points on the object includes,
- program instruction for performing the calculating for a portion of the multiple points during a first frame of image data, and
- program instruction for performing the calculation for a remainder of the multiple points during a next frame of image data.

13. A computing device, comprising:
- a graphics processing unit (GPU) capable of determining lighting characteristics for a point of an object in real time during a video presentation, the lighting characteristics defined through a basis function, the GPU including a stream processor configured to split a stream of data associated with the lighting characteristics into multiple simultaneous operations for determining the lighting characteristics, the determining including;
  - (i) applying a ray tracing algorithm through the stream processor;
  - (ii) determining a direct illumination transfer function through a biased approximator for the point in real time; and
  - (iii) determining a secondary lighting contribution in real time, the secondary lighting contribution identified through a series of multiply and add operations, resulting in coefficients that represent surface reflectance; and
  - (iv) combining the coefficients that represent the surface reflectance with the direct illumination transfer function to render the lighting characteristics of the point of the object; and
- (b) a display screen in communication with the GPU, the display screen configured to present image data representing the object.

14. The computing device of claim 13, wherein the computing device is part of a video game console.

15. The computing device of claim 13, wherein the stream processor is a programmable hardware unit capable of executing code that is replicated multiple times.

16. The computing device of claim 13, wherein the ray tracing algorithm determines the direct illumination transfer function in real time for multiple points on the object and the multiply and add operation determine the secondary lighting contribution in real time without calculating the lighting characteristics at triangle corners.

17. The computing device of claim 13, wherein the GPU is further configured to render the object through a process involving linear interpolation, such that the lighting characteristics are applied to the rendered object.

18. The computing device of claim 13, wherein the basis function is one of a wavelet and a spherical basis function.

* * * * *